(12) United States Patent
Melzer

(10) Patent No.: US 10,796,325 B2
(45) Date of Patent: Oct. 6, 2020

(54) DETERMINING VALUATION INFORMATION FOR A PACKAGE OF MULTIPLE COMPONENTS

(71) Applicant: International Business Machines Corporation, Armonk, NY (US)

(72) Inventor: Glenn Ward Melzer, Sandy, UT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 677 days.

(21) Appl. No.: 15/443,227

(22) Filed: Feb. 27, 2017

(65) Prior Publication Data

US 2018/0247325 A1 Aug. 30, 2018

(51) Int. Cl.
    *G06Q 30/02* (2012.01)
(52) U.S. Cl.
    CPC ............... *G06Q 30/0206* (2013.01)
(58) Field of Classification Search
    None
    See application file for complete search history.

(56) References Cited

U.S. PATENT DOCUMENTS

| 7,139,733 | B2 | 11/2006 | Cao et al. |
| 8,352,355 | B2 | 1/2013 | Ettl et al. |
| 8,635,108 | B2 | 1/2014 | Mesaros |
| 2002/0116236 | A1* | 8/2002 | Johnson .......... G06Q 10/06 705/7.11 |
| 2003/0220773 | A1 | 11/2003 | Haas et al. |
| 2010/0076895 | A1 | 3/2010 | Spencer et al. |
| 2011/0040611 | A1* | 2/2011 | Simmons .......... G06Q 30/0242 705/14.41 |

(Continued)

FOREIGN PATENT DOCUMENTS

WO 2015192106 A1 12/2015

OTHER PUBLICATIONS

Abramowitz, et al., "Handbook of Mathematical Functions With Formulas, Graphs, and Mathematical Tables," National Bureau of Standards Applied Mathematics Series 55, Issued Jun. 1964, 235 pages.

*Primary Examiner* — Mehmet Yesildag
(74) *Attorney, Agent, or Firm* — Amin, Turocy & Watson, LLP

(57) ABSTRACT

Techniques that facilitate determining valuation information for a package of multiple components are provided. In one example, a computer program product comprising a computer readable storage medium having program instructions embodied therewith, the program instructions executable by a processor to cause the processor to generate a data structure organizing historical data associated with a product comprising a plurality of components. The historical data comprises only previously accepted valuation proposals for the product. The computer program product further generates, by the processor, different valuation models for the product respectively based on a first portion of the historical data and different sets of model design parameters, wherein the different valuation models determine valuation information for the product based on acceptance probability information that reflects probabilities different values for the product will be accepted.

21 Claims, 20 Drawing Sheets

(56) References Cited

U.S. PATENT DOCUMENTS

| | | | |
|---|---|---|---|
| 2013/0066813 A1* | 3/2013 | McCaffrey | G06Q 30/0206 |
| | | | 705/413 |
| 2014/0058872 A1* | 2/2014 | Sandholm | G06Q 30/0601 |
| | | | 705/26.1 |
| 2014/0310064 A1 | 10/2014 | Chowdhary et al. | |
| 2014/0310065 A1* | 10/2014 | Chowdhary | G06Q 30/0283 |
| | | | 705/7.35 |

* cited by examiner

Model Design Parameters

|    | Design Rule Field   | Example Value                              |
|----|---------------------|--------------------------------------------|
| 1  | model_ID            | SSG-INA-2015-A02                           |
| 2  | in_file_name        | Data_NA.csv                                |
| 3  | N                   | 100                                        |
| 4  | quote_id_col        | QuoteID                                    |
| 5  | ref_prc_col         | ComListPrice                               |
| 6  | cost_col            | ComTMC                                     |
| 7  | quote_prc_col       | ComQuotePrice                              |
| 8  | prc_col             | ComQuotePricePofL                          |
| 9  | x_col               | ComTMCPofL                                 |
| 10 | First               | ComRevCat                                  |
| 11 | Last                | ComMT                                      |
| 12 | Kfolds              | 5                                          |
| 13 | psych_factor        | 1.115                                      |
| 14 | quote_attribute_cols| ['ComMedPofL', 'LogDealSize', 'Indirect']  |
| 15 | y_intercept         | FALSE                                      |
| 16 | numeric_sort        | ComQuotePrice                              |
| 17 | quote_sort          | ['Indirect', 'CrossBrand']                 |
| 18 | Folds               | 8                                          |
| 19 | fold_select         | 0                                          |
| 20 | Rsquared            | 0.667050818                                |
| 21 | RMSE                | 0.085251195                                |
| 22 | MAPE                | 0.057288343                                |
| 23 | EGPP                | 0.632378101                                |
| 24 | avg_quote_disc      | 0.71460967                                 |
| 25 | avg_opt_prc_disc    | 0.718387282                                |

FIG. 5A

Model Design Parameters (Continued)

| | Design Rule Field | Description |
|---|---|---|
| 1 | model_ID | The unique model name that will be given to this model design. |
| 2 | in_file_name | The name of the clean historical data .csv file. |
| 3 | N | The minimum number of historical components that must be assigned to a segment in order for it to be created. |
| 4 | quote_id_col | The name of the historical data column that contains the quote's unique identifier. |
| 5 | ref_prc_col | The name of the historical data column that contains the component's reference or list price. |
| 6 | cost_col | The name of the historical data column that contains the component's total fixed cost. |
| 7 | quote_prc_col | The name of the historical data column that contains the component's actual quoted price. |
| 8 | prc_col | The name of the historical data column that contains the component's actual quoted price divided by its list price. |
| 9 | x_col | The name of the historical data column that contains a parameter believed to be highly correlated to the component's actual quoted price divided by its list price. (Often this parameter is related to the product delegation or cost.) |
| 10 | First | The name of the historical data column that contains the broadest category of the quote's product hierarchy. |

FIG. 5B

Model Design Parameters (Continued)

| | Design Rule Field | Description |
|---|---|---|
| 11 | Last | The name of the historical data column that contains the narrowest category of the quote's product hierarchy that is intended to be used in the product segmentation. (More detailed columns could exist in the historical data to the right of this column, but they won't be used in this design's segmentation.) |
| 12 | Kfolds | The number of folds used in the k-fold cross validation used to calculate statistics for pruning insignificant nodes of the segmentation tree. |
| 13 | psych_factor | The factor used to uplift the low, median, and high segment price points and thus remove bias from using only win historical data. |
| 14 | quote_attribute_cols | A Python list containing the names of historical data columns containing numerical data to be used in the quote attribute segmentation regression. |
| 15 | y_intercept | TRUE or FALSE. This indicates if the component simple linear regression will include a y intercept. |
| 16 | numeric_sort | For dividing the clean historical data into a training set and a test set. The numeric_sort field is applied after the quote_sort field is applied. The sort fields ensure the data set is properly ordered before the folds are applied and the test set extracted. |
| 17 | quote_sort | See numeric_sort above. |
| 18 | Folds | For dividing the clean historical data into a training set and a test set. This is the total number of folds (i.e. sections) that the clean historical data will be divided into. (Note that folds numbers typically are in the range of 5 to 10.) It is possible to input zero into this field. When this is done, no test set is created and the entire data set is used for training. This is done when the model design has been selected and the model is being built for production using all available historical data. |
| 19 | fold_select | For dividing the clean historical data into a training set and a test set. This is the fold number that will be selected for the test set. (Note that using zero will cause python to automatically select the middle fold for the test set – this is a good default value.) |

FIG. 5C

Model Design Parameters (Continued)

| | Design Rule Field | Description |
|---|---|---|
| 20 | Rsquared | Leave empty. The python script will populate this field with the R squared value of how sell the model can predict the actual historical price. |
| 21 | RMSE | Leave empty. The python script will populate this field with the Root Mean Squared Error estimate between the model predicted price and the actual historical price. |
| 22 | MAPE | Leave empty. The python script will populate this field with the Mean Average Percent Error estimate between the model predicted price and the actual historical price. |
| 23 | EGPP | Leave empty. The python script will populate this field with the Estimated Gross Profit Percent improvement. This value indicates how much additional GP value will be created by using the optimal price compared to the actual historical price. (For example, if the EGGP was .10 and the historical GP generated was $10M, then the GP using the optimal price is estimated at $11M. |
| 24 | avg_quote_disc | Leave empty. The python script will populate this field with the average quote discount value. |
| 25 | avg_opt_prc_disc | Leave empty. The python script will populate this field with the average optimal price discount value. |

FIG. 5D

VALUATION REPORT

|  |  |  | Line Item (i.e. cherry pick) | | Bottom Line (i.e. all or nothing) | |
|---|---|---|---|---|---|---|
|  | Market Segment Price Range | High | 89,525 | | | |
|  |  | Median | 61,126 | | | |
|  |  | Low | 42,606 | | | |
|  |  |  | Quote Price | Optimal Price | Quote Price | Optimal Price |
| Historical Segmentation 116 | Amount |  | 60,150 | 66,246 | 60,150 | 58,605 |
|  | Win Probability |  | 58.15% | 67.11% | 52.88% | 57.51% |
|  | Profit Contribution |  | 20,615 | 26,711 | 20,615 | 19,070 |
|  | Expected Profit Contribution |  | 11,989 | 17,925 | 10,901 | 10,968 |
|  | Confidence Interval Low Price |  |  | 61,606 |  | 54,406 |
|  | Confidence Interval High Price |  |  | 71,192 |  | 63,242 |
|  | Customized Optimal Price Range | High |  | 75,000 | | |
|  |  | Median |  | 55,000 | | |
|  |  | Low |  | 40,000 | | |
|  |  |  | Quote Price | Optimal Price | Quote Price | Optimal Price |
| Custom Client Segmentation 1204 | Amount |  | 60,150 | 61,592 | 60,150 | 53,706 |
|  | Win Probability |  | 36.73% | 72.08% | 31.78% | 55.00% |
|  | Profit Contribution |  | 20,615 | 22,057 | 20,615 | 14,170 |
|  | Expected Profit Contribution |  | 7,572 | 15,900 | 6,552 | 7,793 |
|  | Confidence Interval Low Price |  |  | 58,119 |  | 50,587 |
|  | Confidence Interval High Price |  |  | 65,119 |  | 57,101 |

FIG. 13

TARGET PRICING CONIDENCE INTERVAL CHART

| Potential Proposal Price | Confidence Metric | Win Odds |
|---|---|---|
| 1,130 | 0.02 | 1% |
| 1,115 | 0.04 | 2% |
| 1,100 | 0.09 | 5% |
| 1,085 | 0.17 | 9% |
| 1,070 | 0.26 | 15% |
| 1,055 | 0.37 | 22% |
| 1,040 | 0.49 | 29% |
| 1,025 | 0.60 | 37% |
| 1,010 | 0.70 | 45% |
| 995 | 0.79 | 52% |
| 980 | 0.87 | 59% |
| 965 | 0.92 | 65% |
| 950 | 0.96 | 71% |
| 935 | 0.99 | 75% |
| 920 | 1.00 | 79% |
| 905 | 1.00 | 83% |
| 890 | 0.99 | 86% |
| 875 | 0.97 | 88% |
| 860 | 0.95 | 90% |
| 845 | 0.92 | 92% |
| 830 | 0.88 | 93% |
| 815 | 0.85 | 94% |
| 800 | 0.81 | 95% |
| 785 | 0.76 | 96% |
| 770 | 0.72 | 96% |

```
┌─────────────────────────────────────┐
│ RECEIVING, BY A DEVICE COMPRISING A │
│ PROCESSOR, A VALUATION REQUEST FOR A│──1602
│ PRODUCT, WHEREIN THE VALUATION      │
│ REQUEST COMPRISES PRODUCT INFORMATION│
│ IDENTIFYING THE PRODUCT AND         │
│ RESPECTIVE COMPONENTS OF THE PRODUCT│
└─────────────────────────────────────┘
                  │
                  ▼
┌─────────────────────────────────────┐
│ DETERMINING, BY THE DEVICE, VALUATION│
│ INFORMATION FOR THE PRODUCT BASED ON │
│ THE PRODUCT INFORMATION AND A        │
│ VALUATION MODEL GENERATED FOR THE    │
│ PRODUCT, WHEREIN THE VALUATION MODEL │
│ WAS GENERATED BASED ON HISTORICAL DATA│
│ COMPRISING ONLY PREVIOUSLY ACCEPTED  │──1604
│ VALUATION PROPOSALS FOR SAME OR SIMILAR│
│ PRODUCTS AND DIFFERENT VALUES FOR THE│
│ PRODUCT DETERMINED BASED ON THE      │
│ HISTORICAL DATA AND AN ACCEPTANCE    │
│ PROBABILITY INFORMATION FUNCTION THAT│
│ DETERMINES THE DIFFERENT VALUES BASED│
│ ON PROBABILITIES THE DIFFERENT VALUES│
│ WILL BE ACCEPTED                     │
└─────────────────────────────────────┘
```

FIG. 16

DETERMINING VALUATION INFORMATION FOR A PACKAGE OF MULTIPLE COMPONENTS

BACKGROUND

The subject disclosure relates to computer program analytics that facilitate determining valuation information for a package of multiple components. Automated methods for determining the valuation of a product generally involve the creation of mathematical valuation models based on historical data of similar transactions. These valuation models generally aim to determine a target or optimal price for the product that maximizes expected profit. Existing techniques for building these valuation models employ machine learning algorithms based on logit regression that determine win probability as a function of price in the historical data. For example, U.S. patent application Ser. No. 10/356,717 describes a method for forming a market response model that "employs a binomial logistic to determine an estimated probability of winning a bid or auction according to various predictors."

Logit regression requires that the historical data evaluated contain price data for both winning and losing transactions. The regression mathematics estimate the win probability function by inferring that losing prices were too high and winning prices were too low. A problem with this approach is that often a proposal loses for non-price reasons (e.g., insufficient customer funds, customer strategy change, project delay, etc.). These types of losses contaminate the data and reduce model reliability. Further, the extraction of historical data and its subsequent cleansing before ingestion into the model building process is critical. When the historical data includes both wining and losing transaction data, the difficulty and inefficiency of this data cleansing and extraction process is exacerbated.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate determining the target selling price for a customized package of multiple commodities.

In one embodiment, a computer program product comprising a computer readable storage medium having program instructions embodied therewith, the program instructions executable by a processor to cause the processor to generate a data structure organizing historical data associated with a product comprising a plurality of components. The historical data comprises only previously accepted valuation proposals for the product. The computer program product further generates, by the processor, different valuation models for the product respectively based on a first portion of the historical data and different sets of model design parameters, wherein the different valuation models determine valuation information for the product based on acceptance probability information that reflects probabilities different values for the product will be accepted. In some embodiments, elements described in connection with the computer program product can be embodied in different forms such as a computer-implemented method, a computer system, or another form. According to this embodiment, benefits are realized in that the valuation model can be generated using historical data that comprises only previously accepted valuation proposals for same or similar products, thereby enhancing the accuracy and efficiency of organizing the historical data. Further, the accuracy of valuation information determined by the valuation models is improved. In particular, the valuation information determined by the valuation models need not suffer from errors introduced by using non-price driven loss data.

In some implementations, the program instructions further cause the processor to generate evaluation information for the different valuation models by evaluating the different valuation models using a second portion of the historical data, wherein the evaluation information comprises fit statistic values for the different valuation models. Because the different valuation models are evaluated using historical data that was not used to create the valuation models, the fit statistics generated are considered unbiased and therefore provide accurate model fit estimates. The program instructions further cause the processor to determine scores for the different valuation models based on the fit statistic values respectively associated with the different valuation models, and select a valuation model of the different valuation models associated with a score that is closest to a reference score. The subject automated scoring and selection of an optimal valuation model improves the processing time for generation and selection of the best valuation model for the product.

In another embodiment, a system is provided that comprises a memory that stores computer executable components, and a processor that executes computer executable components stored in the memory. The computer executable components comprise an indexing component that generates a data structure organizing historical data associated with a product that comprises a plurality of components, wherein the historical data comprises only previously accepted valuation proposals for the product. The computer executable components further comprise a model creation component that generates a valuation model for the product based on the historical data and one or more model design parameters, wherein the valuation model determines valuation information for the product based on an acceptance probability function that determines probabilities different values for the product, determined based on the historical data, will be accepted. Because the system generates the valuation model using historical data that comprises only previously accepted valuation proposals for same or similar products, the accuracy and efficiency of organizing the historical data is improved. Further the valuation information determined by the valuation models need not suffer from errors introduced by using non-price driven loss data. In some implementations, the different values comprise a low value associated with a high acceptance probability, a median price value associated with a median acceptance probability, and a high value associated with a low acceptance probability. These market segmentation range values can be advantageous during the process of negotiating a deal for the sale of the product.

In one or more additional embodiments, a computer-implemented method is described that comprises receiving, by a device operatively coupled to a processor, a valuation request for a product, wherein the valuation request comprises product information identifying the product and respective components of the product. The computer-implemented method further comprises determining, by the device, valuation information for the product based on the product information and a valuation model generated for the product, wherein the valuation model was generated based on historical data comprising only previously accepted valuation proposals for same or similar products and different values for the product determined based on the historical data and an acceptance probability information function that determines the different values based on probabilities the different values will be accepted. Because the computer-implemented method generates the valuation model using historical data that comprises only previously accepted valuation proposals for same or similar products, the accuracy and efficiency of organizing the historical data is improved. Further the valuation information determined by the valuation models need not suffer from errors introduced by using non-price driven loss data.

DESCRIPTION OF THE DRAWINGS

FIGS. 5A-5D provide a design parameters chart defining example design parameters in accordance with one or more embodiments described herein.

FIG. 13 provides a chart including example valuation information that can be generated by the subject valuation report generation component in accordance with one or more embodiments described herein.

FIG. 14 provides an example illustration of a valuation confidence interval chart that can be generated by the subject valuation report generation component in accordance with one or more embodiments described herein.

FIG. 16 illustrates a flow diagram of another example, non-limiting computer-implemented method that facilitates determining valuation information for package of multiple components in accordance with one or more embodiments of the disclosed subject matter.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure provides systems, computer-implemented methods, apparatus and/or computer program products that facilitate determining valuation information for a package of multiple components. In various embodiments, using machine learning techniques, one or more valuation models are developed for a particular product composed of a plurality of components based on segmentation of historical data for same or similar products. The historical data used to develop the subject valuation models can include only win data. In this regard, win data can refer to valuation proposals or quotes for the product that were previously accepted (e.g., for purchase) by consumer. The valuation models can be configured to determine valuation information for the product based on an acceptance probability function. For example, with regard to a product for sale, the acceptance probability function can reflect a probability the product will be accepted for purchase at a particular price. In one or more embodiments, the acceptance probability function can be used to determine, based on the historical data, low (L), median (M), and high (H) values for the product respectively associated with a H acceptance probability (e.g., a 95% probability the L value will be accepted), a M acceptance probability (e.g., a 50% the M value will be accepted), and a L acceptance probability (e.g., 5% that the L value will be accepted). The valuation models can further be configured to determine a target value for the product that maximizes profit based on acceptance probability associated with the target value. The valuation models can then be used to automatically generate a valuation report for a new product that is composed of same or similar components.

The subject techniques can be used to generate valuation models and associated valuation reports for various types of products so long as the products comprise of a plurality of different components or commodities that are respectively associated with historical pricing data for the respective components or commodities. Various aspects of the disclosed pricing techniques are exemplified with respect to a computer technology product that is composed of hardware, software and services. For example, such products are often purchased and utilized by various business to server their computer technology needs, from actual computing hardware, data storage, software applications and associated services. However, it should be appreciated that the disclosed systems and mythologies are not limited to this type of product.

Figure 1:
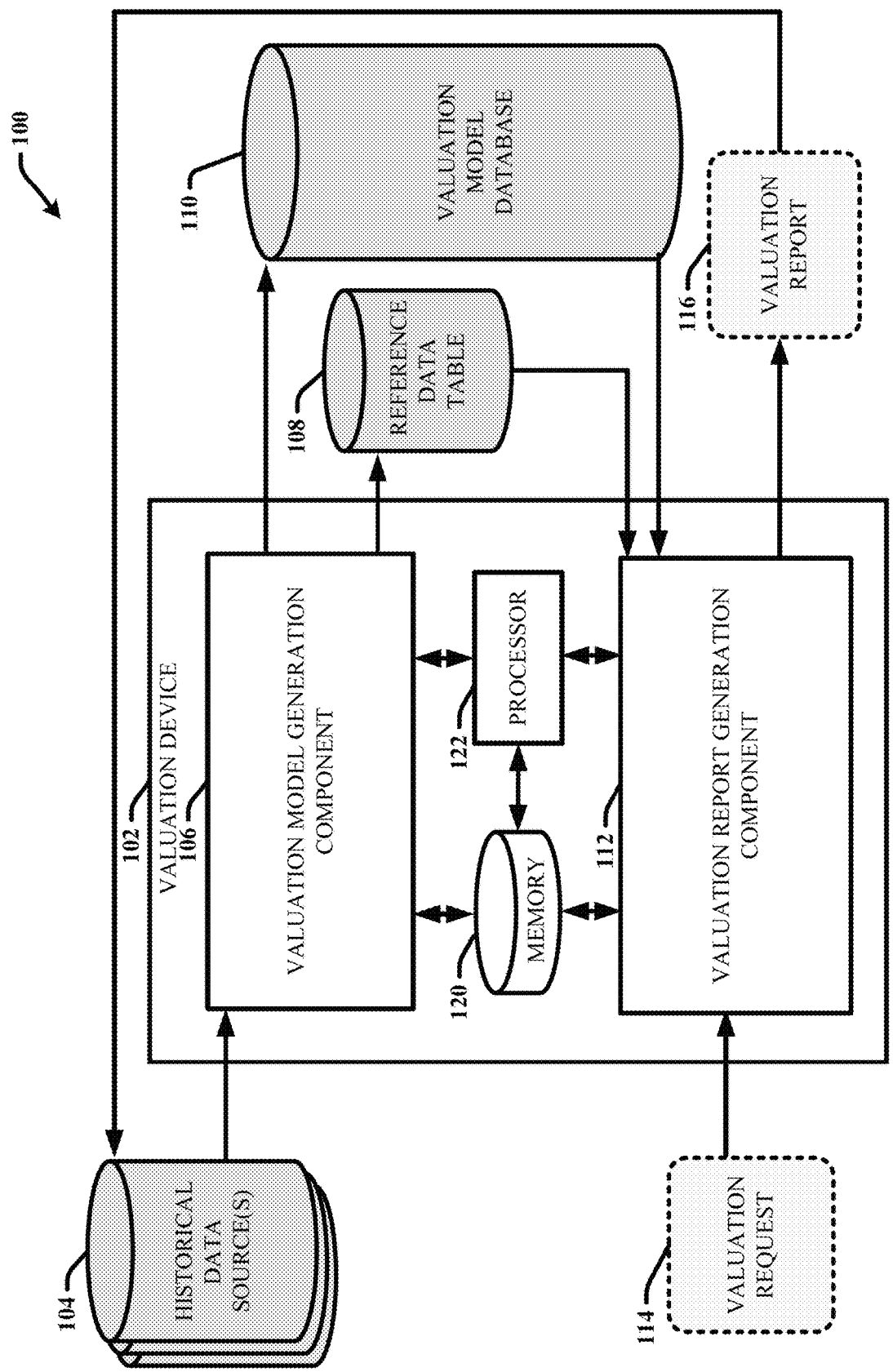
FIG. 1 illustrates a block diagram of an example, non-limiting system that facilitates determining valuation information for package of multiple components in accordance with one or more embodiments of the disclosed subject matter.

Turning now to the drawings, FIG. 1 illustrates a block diagram of an example, non-limiting system 100 that facilitates determining valuation information for package of multiple components in accordance with one or more embodiments of the disclosed subject matter. System 100 and/or the components of the system 100 or other systems disclosed herein can be employed to use hardware and/or software to solve problems that are highly technical in nature, that are not abstract, and that cannot be performed as a set of mental acts by a human. Further, some of the processes performed can be performed by specialized computers for carrying out defined tasks related to developing valuation models based on historical data using machine-learning techniques, and generating target pricing data for a customized package of multiple commodities using one or more of the valuation models. System 100 and/or components of system 100 or other systems described herein can be employed to solve new problems that arise through advancements in technology, computer networks, the Internet, and the like. System 100 or other systems detailed herein can provide technical improvements to target pricing analytics, including improved processing time associated with developing and applying valuation models, and improving target pricing estimates that need not suffer from errors introduced by using non-price driven loss data.

Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. For example, in the embodiment shown, system 100 includes a valuation device 102 that includes a valuation model generation component 106 and valuation report generation component 112. System 100 also includes various data sources and data structures comprising information that can be used by and/or generated by the valuation model generation component 106 and/or the valuation report generation component 112. For example, these data sources and data structures can include but are not limited to: include one or more historical data sources 104, one or more reference data sources 206, a reference data table 108, and valuation model database 110. The valuation device 102 can include or be operatively coupled to at least one memory 120 and at least one processor 122. The at least one memory 120 can further store executable instructions (e.g., the valuation model generation component 106 and the valuation report generation component 112) that, when executed by the at least one processor 122, facilitate performance of operations defined by the executable instruction. In some embodiments, the memory 120 can also store the various data sources and/or structures of system 100 (e.g., the one or more historical data sources 104, the one or more reference data sources 206, the reference data table 108, and the valuation model database 110). In other embodiments, the various data sources and structure of system 100 can be stored in other memory (e.g., at a remote device or system), that is accessible to the valuation model generation component 106 and/or the valuation report generation component 112. Examples of said processor 122 and memory 120, as well as other suitable computer or computing-based elements, can be found with reference to FIG. 18, and can be used in connection with implementing one or more of the systems or components shown and described in connection with FIG. 1 or other figures disclosed herein.

The valuation model generation component 106 can be configured to employ various machine learning algorithms to generate mathematical valuation models for products comprising a plurality of components based on historical data for same or similar products. These machine learning algorithms employ multiple linear regressions to determine valuation information for the product based on component attributes and collective product attributes associated with the respective components of the product as assigned to nodes of a segmentation tree. These machine learning algorithms can be configured to determine the valuation information based on an acceptance probability function that determines different values or price points for the product based on probabilities the different values will be accepted. The valuation models and associated data (e.g., model identifier (ID), model design parameters, model segmentation tree, model fit statistics, etc.) generated by the valuation model generation component 106 can be stored in the valuation model database 110 for use by the valuation report generation component 112 to generate valuation reports for similar products.

The historical data used by the valuation model generation component 106 to develop the subject valuation models can include only previously accepted proposals for the same or similar products (generally referred to herein as win data). In this regard, the historical data used by the valuation model generation component 106 to generate valuation models included in the valuation model database 110 can exclude historical proposals or quotes for same or similar products that were not accepted due to the proposal value or price being too high as well as for various other possible reasons. In various implementations, the historical data employed by the valuation model generation component 106 can be extracted from one or more historical data sources 104. The historical information can include for example, information identifying previously accepted proposals or quotes for same or similar products. In addition to the proposal or quote total value or price, the respective proposals or quotes can include information identifying the respective components that make up the product, and component attributes that are correlated to the quote value or price. These components attributes can include at least a reference price for the respective components from which discounting can be measured (e.g., the list price, the cost, etc.). These components level attributes can also include information such as sell price, component type, component brand, and the like. In some implementations, the component attributes can also include hierarchy information regarding relationships of the respective components that can be used to facilitate generating a segmentation tree for the product. The respective proposals or quotes can also include collective product attributes that apply to all of the components or the product as a whole. For example, the collective product attributes can include but are not limited to: deal size, customer industry, sales channel, and the like.

The valuation report generation component 112 can be configured to automatically generate a valuation report 116 for a product using a valuation model included in the valuation model database 110 generated for a same or similar product. For example, the valuation report generation component 112 can be configured to receive user requests (e.g., in the form of an application program interface (API) call from another application or device) for valuation reports for product deals. In the embodiment shown, such a user request is depicted as valuation request 114. The valuation request 114 will include at least some product data describing the product to be evaluated. For example, the product data can include information identifying the product, the product components, the component attributes and the collective product attributes. The product data included in the request can be used as input to the valuation model, generated by the valuation model generation component 106, employed by the valuation report generation component 112 to generate the valuation report 116. In some implementations, the valuation report generation component 112 can also employ the product data to select the appropriate valuation model from the valuation model database 110 to evaluate the product (e.g., in embodiments in which the valuation model database includes different models for a same product or different models for different products).

In one or more embodiments, based on reception of the valuation request 114, the valuation report generation component 112 can run the appropriate/selected valuation model against the product data to generate a valuation report 116. The valuation report generation component 112 can further provide the requesting user (e.g., via the requesting application/device) with the resulting target pricing product quote in a suitable format (e.g., in a report including a chart, a table, a graph, etc.). The valuation report 116 can include valuation information for the products helps a seller or pricer to know what the target price would be based on the historical data and is intended to influence their pricing decision. The valuation report 116 can include a variety of rich valuation information for the product, such as but not limited to L, M, and H values (e.g., pricing points) for the product, acceptance or win probably associated with different values or price points for the product, confidence interval information, and the like. In one or more embodiments, the valuation reports generated by the valuation report generation component 112 (e.g., the valuation report 116) can be added to the one or more historical data sources 104 for use by the valuation model generation component 106 in association with continued development and improvement of valuation models generated by the valuation model generation component 106.

In various implementations, the valuation report generation component 112 can determine information that is needed as input values for the valuation model yet missing from the valuation request 114 using the reference data table 108. For example, the reference data table 108 can include reference pricing data for defined product components. In another example, the reference data table 108 can include customer industry identifiers (IDs). According to this example, if the customer industry identifier for a particular product quote is not included in the quote data for the product but a customer number is included in the quote data, using the reference data table, the industry ID can be determined based on the customer number. In another example, the reference data table 108 can include information defining the complete product hierarchy given the respective product IDs. In some implementations, the valuation model generation component 106 can also employ the reference data table to facilitate generating the valuation models. According to these implementations, the reference data table can include various known information about different products and associated components that may not be included in the historical data at the one or more historical data sources 104.

FIGS. 2-10 provide additional detailed information regarding the valuation model generation component 106 and the mechanisms used to generate the valuation models included in the valuation model database 110. FIGS. 11-14 provide additional information regarding the operations of the valuation report generation component 112 and the valuation report 116.

Figure 2:
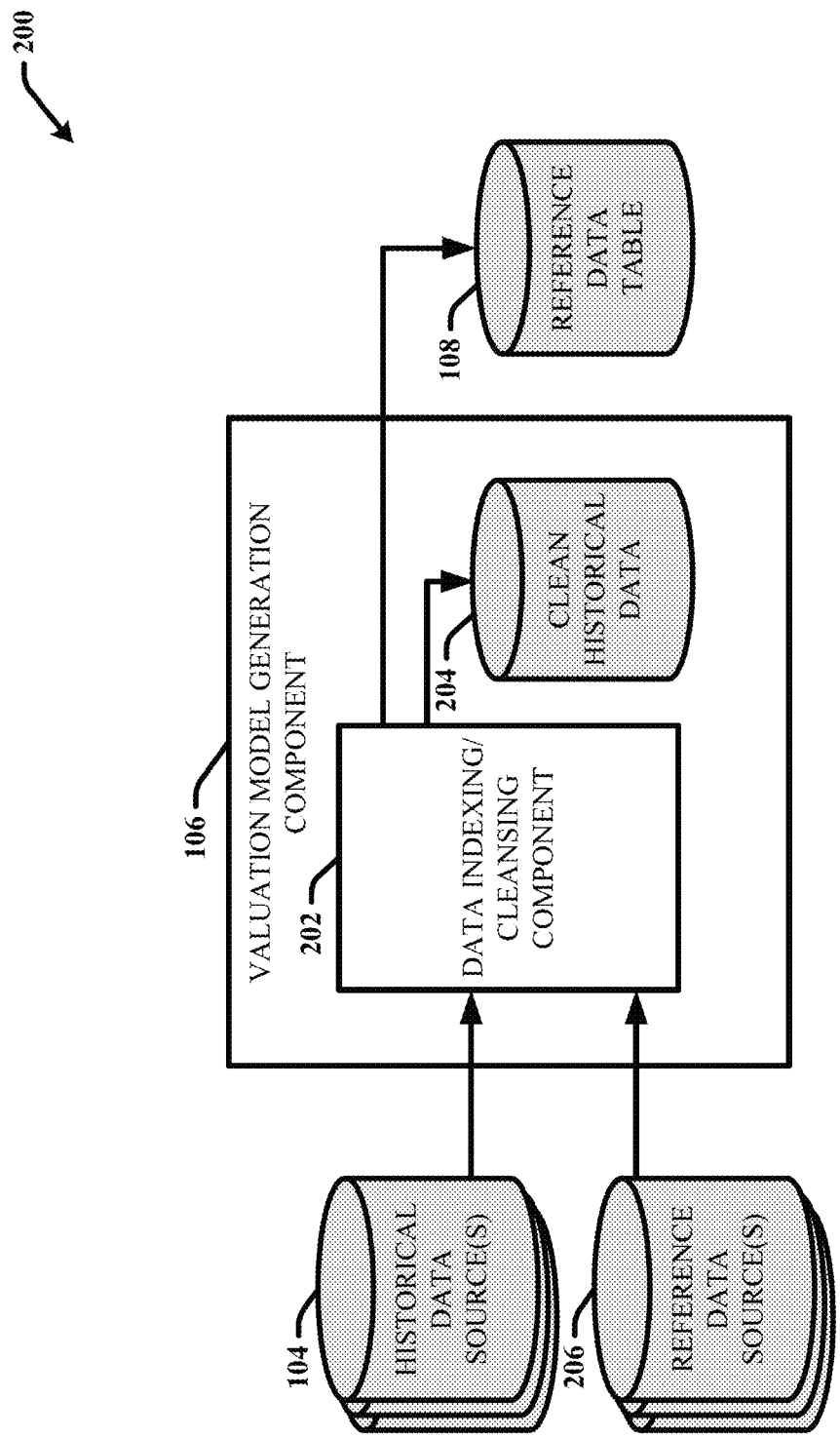
FIG. 2 illustrates is a block diagram of an example, non-limiting subsystem that facilitates generating clean historical data and reference data in accordance with one or more embodiments of the disclosed subject matter.

With reference now to FIG. 2, illustrated is a block diagram of an example, non-limiting subsystem 200 that facilitates generating clean historical data and reference data in accordance with one or more embodiments of the disclosed subject matter. In one or more embodiments, subsystem 200 is a subsystem of system 100 (e.g., system 100 can include subsystem 200). For example, subsystem 200 includes the one or more historical data sources 104, the valuation model generation component 106, and the reference data table 108. Subsystem 200 further includes data indexing/cleansing component 202, clean historical data 204, and one or more reference data sources 206. Repetitive description of like elements employed in other embodiments described herein is omitted for sake of brevity.

The subject valuation techniques stand on the creation of valuation models based on historical data of wining transactions for similar products with similar components and attributes. The logic used by the valuation model generation component 106 to build these models can be based on one or more machine learning algorithms that process this historical data. Accordingly, the extraction of the appropriate historical data and its subsequent cleansing before ingestion into the model building process is critical. In one or more embodiments, the data indexing/cleansing component 202 can be configured to perform such extraction and cleansing of the historical data included in the one or more historical data sources 104 to generate clean historical data 204. For example, with respect to a particular defined product composed of a plurality of components/commodities, the data indexing/cleansing component 202 can be configured to query the one or more historical data sources 104 to identify previously accepted valuation proposals (e.g., quotes) for same or similar products. For example, each valuation proposal can include information identifying a total value for the product (e.g., purchase price) and the collection of individual components that make up the product. For each valuation proposal, data indexing/cleansing component 202 can determine the component attributes that are unique to the respective components (e.g., reference value/price, sell value/price, type, brand, etc.), referred to herein as component attributes. The data indexing/cleansing component 202 can also determine the collective product attributes that apply to all components (e.g., customer industry, deal size, product location/region, etc.), referred to herein collective product attributes. The data indexing/cleansing component 202 can further generate the clean historical data 204 by generating a data structure that organizes information identifying the respective winning proposals. For example, for each winning proposal, the information in the data structure can identify the total value/price of the product, the components that make up the product, the component attributes, and the collective product attributes.

In some embodiments, the data indexing/cleansing component 202 can also be configured to parse through the one or more reference data sources 206 to generate the reference data table 108. For example, the data indexing/cleansing component 202 can be configured to parse through various reference data sources to identify relevant product data that may not be include in the historical data (e.g., component list or reference value, industry ID, component hierarchy information, etc.). The data indexing/cleansing component 202 can further consolidate and organize the reference data into the reference data table 108. The valuation model generation component 106 and the valuation report generation component 112 can further employ the reference data table 108 to quickly look up and retrieve relevant data that is missing from historical data or from a valuation request 114 needed to generate a valuation model for the product or apply a valuation model to the product.

Figure 3:
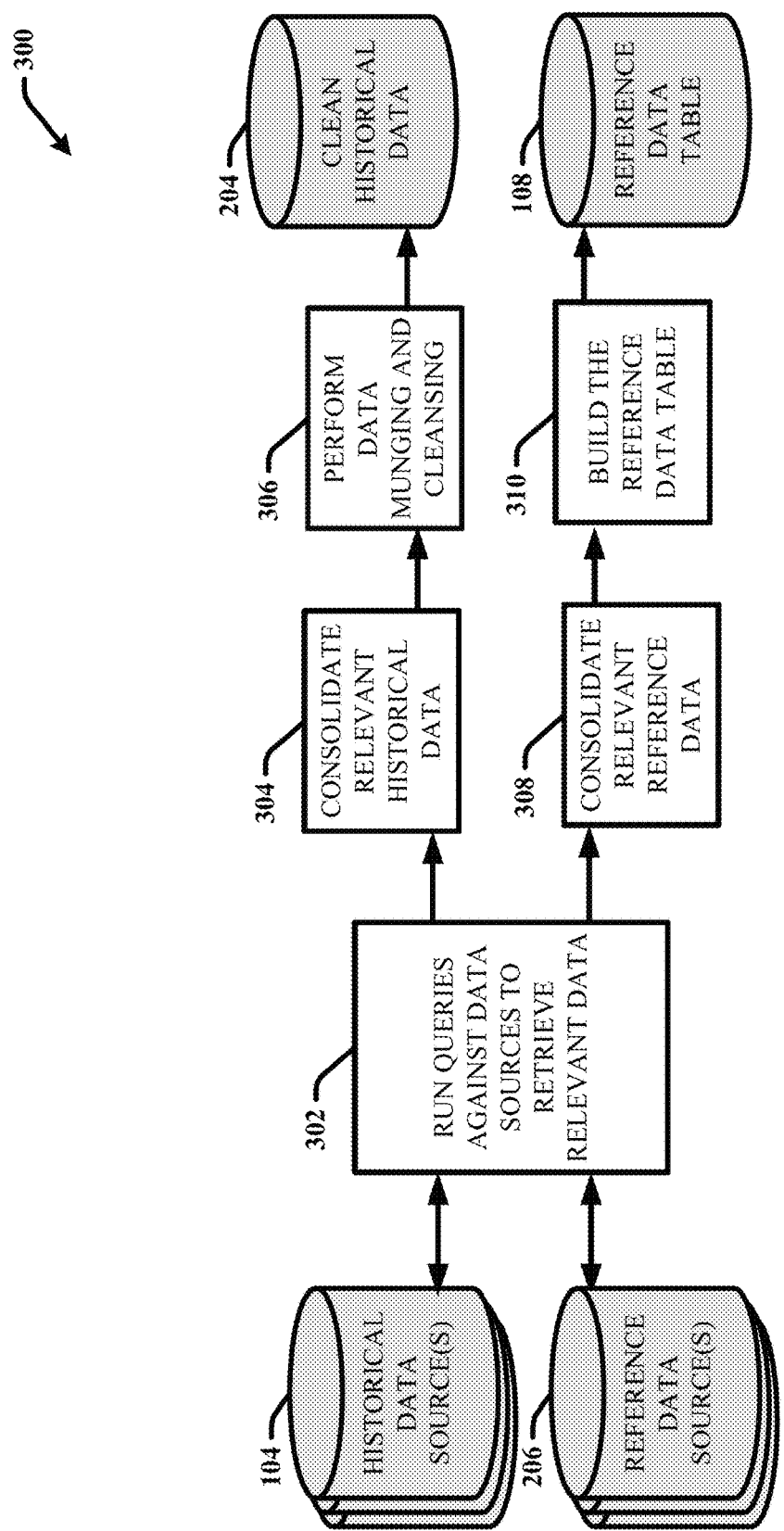
FIG. 3 provides a flow diagram of an example, non-limiting computer-implemented method for generating clean historical data and reference data in accordance with one or more embodiments of the disclosed subject matter.

FIG. 3 provides a flow diagram of an example, non-limiting computer-implemented method 300 for generating the clean historical data 204 and the reference data table 108 by the data indexing/cleansing component 202 in accordance with one or more embodiments of the disclosed subject matter.

At 302, method 300 initially involves executing queries (e.g., by the data indexing/cleansing component 202) against the one or more historical data sources 104 and the one or more reference data sources 206 to retrieve relevant data for a defined product. For example, the relevant information can include previously accepted valuation proposals for same or a similar product. The relevant information can also include product information included in one or more reference data source 206 that may excluded from the historical quotes. At 304, the relevant historical data for the product can be consolidated (e.g., into a single or separate files) and stored in a suitable data structure (e.g., by the data indexing/cleansing component 202). In one example implementation, the data structure is a .csv file. For example, the purpose of queries is to extract from one or more historical data sources 104, (e.g., a historical transaction data warehouse a file), the raw data that describes each winning product transaction from a specific time period. Once the query for a particular product is set up and running properly, it can be used on a regular basis for extracting new data needed for optimizing and/or refreshing valuation models (e.g., new data based associated with evolving market trends). In various implementations, the consolidated historical data will include many different winning proposal quotes for a same or similar product. Each proposal quote will consists of one or more components (also referred to as line items), which are individual product components with unique prices. In one or more embodiments, the consolidated historical data can be organized into a table (or another other suitable data structure) that has several rows, wherein each row describes a separate product component. So, for example, a proposal quote consisting of five components would require five rows in the table. Since the table will contain many quotes covering a specified time frame, the table will typically contain tens of thousands of rows. The table can further have columns that describe the component attributes (e.g., unique characteristics of the component such as the component ID, reference/list price, cost, sell price, etc.), and collective product attributes (e.g., general characteristics of the entire quote that all component share such as quote ID, customer name, channel, industry, location, etc.) associated with each row. Therefore some column names will represent component attributes while other column names represent quote level attributes.

At 306, the data indexing/cleansing component 202 can processes the consolidated historical data by cleansing and munging (e.g., manipulating) the data to generate the clean historical data 204. This can include for example, removing unusable data (e.g., records of lost transactions, records with zero reference or proposed price, etc.), adding missing data (e.g., using data included in the reference table 108), and the like. For example, in one or more embodiments, in order to create the clean historical data 204 from the consolidated table data structure described above, the consolidated historical data can be processed using a suitable script configured to process the table and remove certain rows and columns, change the order of one or more columns, add new columns (e.g., based on the input data) and the like. The data columns can also be defined with titles and data formats standardized so that the clean historical data 204 can be understood by the machine learning functions. In various exemplary embodiments, a Python™ scripting language can be employed to generate the clean historical data 204. However various other computer programming languages can be used to implement the various features and functionalities of the valuation model generation component 106 (and other components described herein).

In some implementations, the data indexing/cleansing component 202 have flexibility with respect to determining what columns to include in the clean historical data 204. However, the data indexing/cleansing component 202 can be configured to employ a defined structure and logical ordering of the column fields. In one example embodiment, clean historical data 204 can include attribute columns or fields grouped into the following sections: 1. valuation proposal ID, 2. component financial details (numeric attribute data, including reference/list price, cost, sell price, etc.), 3. component product hierarchy, 4. collective product attributes, 5. target linear function (numeric, percent of list price data), and 6. output statistics (left blank, but requires specific column names). The resulting clean historical data 204 can be used to build valuation models for the product. Different valuation model designs can use the same clean historical data 204 as the starting point for building a valuation model.

Similarly at 308, the relevant product reference data extracted from the one or more reference data sources 206 can be consolidated and stored (e.g., by the data indexing/cleansing component 202). At 310 the data indexing/cleansing component 202 can further build the reference data table 108 using a defined script. For example, there may be instances where the clean historical data 204 does not contain all of the necessary values used in the valuation model. In these cases, the reference data table 108 can created and logic built that uses that table to augment the clean historical data 204 with the needed fields from the reference data table 108 before the clean historical data 204 can be processed by the valuation model generation component 106 in association with generating valuation models.

Figure 4:
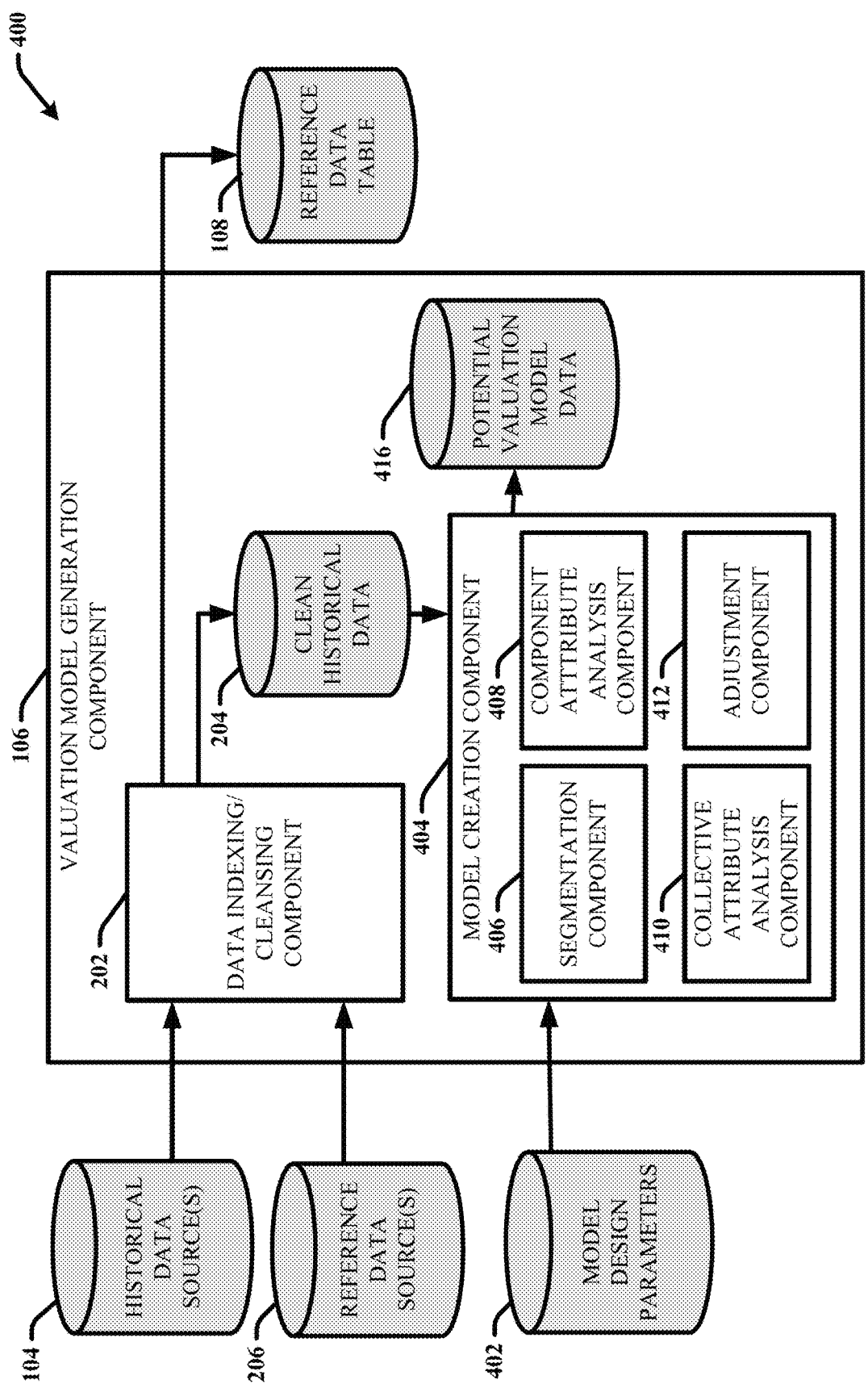
FIG. 4 illustrates a block diagram of an example, non-limiting subsystem that facilitates generating valuation models in accordance with one or more embodiments of the disclosed subject matter.

FIG. 4 illustrates a block diagram of an example, non-limiting subsystem 400 that facilitates generating potential valuation models in accordance with one or more embodiments of the disclosed subject matter. In one or more embodiments, subsystem 400 is a subsystem of system 100 (e.g., system 100 can include subsystem 400). Subsystem 400 can include the same or similar features and components as subsystem 200 with the addition of the model creation component 404 to the valuation model generation component 106. The model creation component 404 can include segmentation component 406, component attribute analysis component 408, collective attribute analysis component 410 and adjustment component 412. Subsystem 400 can also include design parameters 402, and potential valuation model data 416. Repetitive description of like elements employed in other embodiments described herein is omitted for sake of brevity.

Once the clean historical data 204 is ready, the next stage is to create one or more potential valuation models for the product using one or more machine learning algorithms. The one or more machine learning algorithms can be configured to determine how assign respective subsets of components of the product to tree nodes of a segmentation tree. The one or more machine learning algorithms can further employ multiple linear regressions to determine how historical component attributes and historical collective product attributes associated with respective components of the product, as assigned to the nodes of the segmentation tree, impact the valuation of the product. Based on the outputs of these linear regressions, these machine learning algorithms can further be configured to determine different historical values or price points for the product (e.g., L, M and H values) respectively associated with different probabilities of acceptance (e.g., H, M and L probabilities, respectively).

The input used by the model creation component 404 to generate a potential valuation model includes the clean historical data 204 associated with the product (and potentially some reference data from the reference data table 108 as needed to fill in missing information not included in the clean historical data 204), and one or more a model design parameters 402. In particular, there are various different ways that the clean historical data 204 can be used by the model creation component 404 to generate a valuation model. The rules or parameters defining how the model creation component 404 evaluates the clean historical data to generate a valuation model are defined by a set of design parameters. For example, in some implementations the model design parameters for each valuation model can control the design of the component level segmentation tree used by the model creation component 404 to generate the valuation model. In another implementation, the model design parameters can define the component attributes and/or the collective product attributes to be evaluated. In another example, the model design parameters can define adjustment factors to be used by the adjustment component 412.

Each valuation model generated by the model creation component will have its own set of design parameters. In one or more embodiments, the set of design parameters for each potential valuation model to be generated by the model creation component can be provided to the model creation component 404 (e.g., by a user, such as the model developer) using system 100. In various embodiments, the set of design parameters for each valuation model generated by the model creation component are updated modified and/or extended by the model creation component 404 in association with creation of the respective potential valuation models. In various embodiments, each valuation model generated by the model creation component 404 and its set of design parameters can be stored in the potential valuation model data 416.

FIGS. 5A-5D provides a design parameters chart 500 defining example model design parameters in accordance with one or more embodiments described herein. The design parameters control how the model creation component 404 creates a single valuation model for a product. As shown in FIG. 5A, the model design parameters chart 500 includes a first column corresponding to the design rule field and a second column corresponding to example values for each of the 25 design rule fields. FIGS. 5B-5D provide an additional description column that includes a brief description of the respective design rule fields 1-25. For example, with reference to FIG. 5B, the first design rule field represents the model ID and can include a unique name or number assigned to the particular model for which the design parameters are based. The second design rule field identifies the specific clean historical data file to be used. The third design rule field indicates the minimum number of historical components to be assigned to a segment (e.g., node of a segmentation tree), and so on. In one or more embodiments, at least some of the values provided in the example values column for each of the design rule fields 1-19 are user defined. In various implementation, different sets of model design parameters can be created by varying the values provided for each design rule field 1-19.

Figure 9:
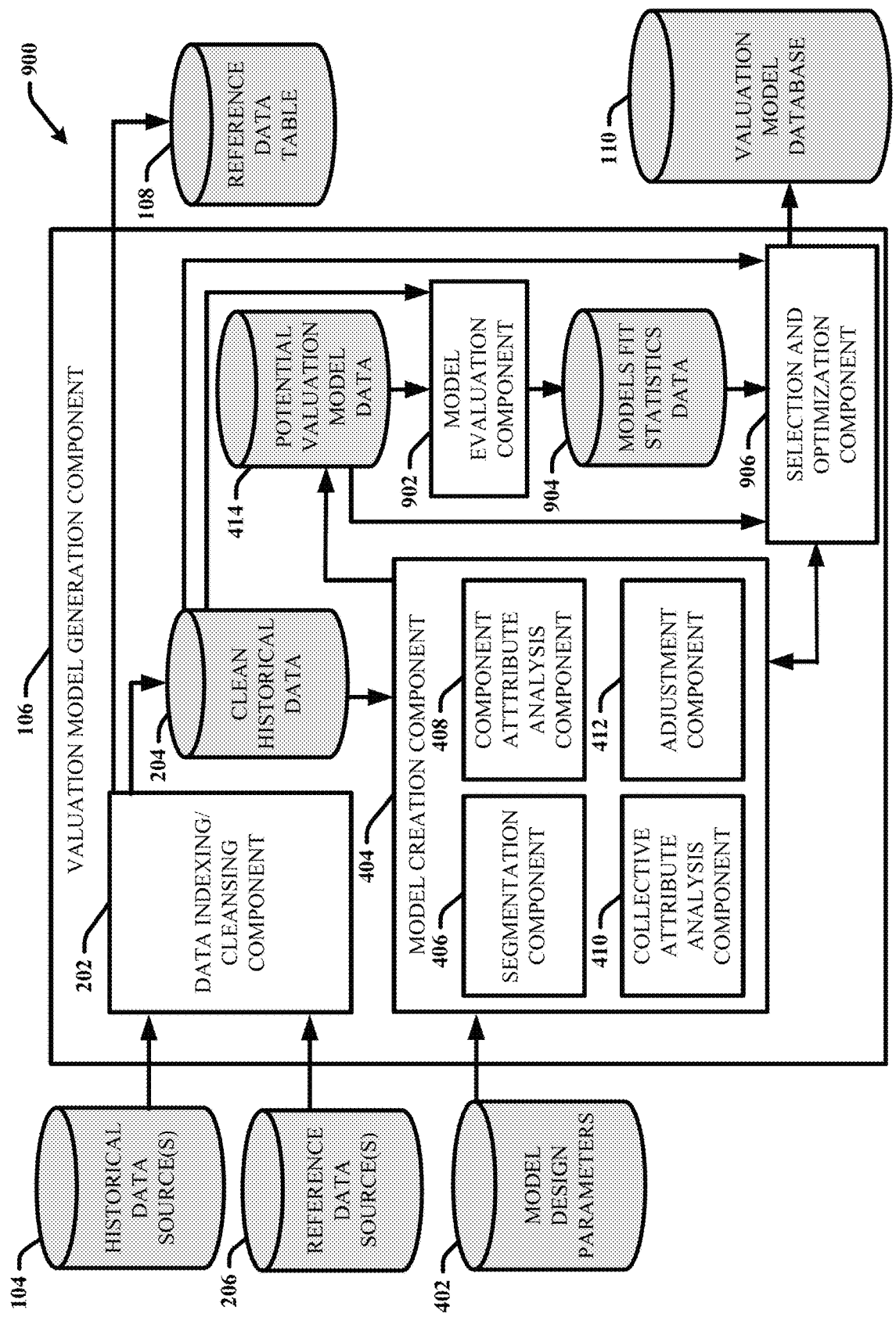
FIG. 9 illustrates a block diagram of an example, non-limiting subsystem that facilitates evaluating potential valuation models in accordance with one or more embodiments of the disclosed subject matter.

With reference to FIG. 5A, the specific example values for design parameters 20-25 are highlighted in gray to indicate that these values represent fit statistics that have been determined and applied by the evaluation component 902, as discussed infra with reference to FIG. 9. Thus in some implementation, the values for the design parameters 20-25 would be initially left blank prior to processing by the model creation component 404 (e.g., the user will leave these fields blank). For example, as shown in FIG. 5D, the description for each of the design rule fields 20-25 indicates that these fields should be left empty and can be populated by the Python™ script (e.g., the machine learning logic functions performed by the valuation model generation component 106). The specific text presented in chart 500 for each design rule field and associated example value is machine readable code written in Python™. This text is merely exemplary.

With reference back to FIG. 4, once a set of model design parameters 402 have been defined, the model creation component 404 can then execute the valuation model building logic to create the respective valuation model. The valuation model building logic involves various functions respectively performed by the model creation component 404 using the segmentation component 406, the component attribute analysis component 408, the collective attribute analysis component 410 and the adjustment component 412.

The valuation model building logic can be based on an acceptance probability function that estimates a probability a proposed value or price for a product will be accepted by a buyer. A more practical display of customer price sensitivity can be represented by acceptance probability information. Such acceptance probability information can indicate for any price as a percentage of the reference price, what the probability is that the customer's maximum price they are willing to pay has not been exceeded (and would therefore represent a winning or accepted price). That is, proposals priced at the H price point are very likely to lose (5% win probability), proposals priced at the L point are very likely to win (95% win probability), and proposals priced at the M price have even odds of winning (50% win probability). Communicating this H, M, L price range to the seller can be very helpful in their interaction with the buyer. The acceptance probability function employed by the model creation component 404 is defined according to the following EQUATION 1:

If $(M-L) < > (H-M)$, then execute step 1, otherwise execute step 2. Then execute step 3.

EQUATION 1

Step 1 (when skew exists, e.g., hyperbolic):

$$B = \frac{2HL - M(H + L)}{2M - H - L}$$

-continued $$A = \frac{V(M+B)(H+B)}{(M+H)}$$

$$C = \frac{-A}{(M+B)}$$

$$S = \frac{A}{(P+B)} + C$$

Step 2 (when no skew exists, e.g., linear):

$$m = \frac{V}{(H-M)}$$

$$b = -m(M)$$

$$zS = m \cdot P + b$$

Step 3:

$$zS = \frac{e^{\left(\frac{-S^2}{2}\right)}}{2.506628275}$$

$$tS = \frac{1}{1 + (.2316419 - |S|)}$$

$$qps = zS(tS(0.31938153 + tS(-0.356563782 +$$
$$tS(1.781477937 + tS(-1.821255978 + tS - 1.330274429)))))$$

Wherein,

If $S < 0$ then Acceptance Probability $= 1 - qps$

If $S >= 0$ then Acceptance Probability $= qps$

And wherein, $P$ = Price for which the win probability is to be calculated $L$ = Low price point (95% win probability)

$M$ = Median price point (50% win probability)

$H$ = High price point (5% win probability)

$V$ = 1.644853475 (a required constant), and $e$ = approximately 2.71828

(the base of the natural logarithm constant).

If the buyer is rational, they will purchase the offering if its value is greater than the price. If the seller is rational, they will sell the offering if they are better off with the sale than without it. Typically, the seller's measure used for this is profit contribution. This measurement is made by taking the sales price and subtracting the incremental costs incurred by fulfilling the transaction. As the price increases, the potential profit contribution of a winning transaction also increases. But at the same time, the probability of winning decreases. For any given price, the model creation component 404 can calculate the profit contribution of associated with a product value and the probability that the product value will be accepted. Multiplying the profit contribution by the acceptance probability results in a measure called the expected profit contribution. The expected profit contribution can is defined by the following EQUATION 2.

Expected Profit Contribution=(price-cost)·Acceptance Probability(price)   EQUATION 2

Finding the target price can be determined by finding the price that maximizes the expected profit contribution, since no other pricing strategy will result in greater profit contribution in the long term. In this regard, the target price can be a single number that maximizes the expected profit contribution function. A target price confidence interval defines a range of possible prices that are close to the target price, but don't significantly reduce the expected profit contribution. For example, if the price is raised, the win probability drops, but is partially offset by the increasing profit. If the price is lowered, the profit decreases, but is partially offset by the win probability increasing. Therefore, the expected profit contribution is relatively stable near the target price. One way of setting the confidence interval is find the prices above and below the target price that deliver 95% (or some other desired percent) of the expected profit contribution of the target price. This allows the seller to know that any price they choose in that range will deliver at least the desired percentage of the expected profit contribution.

The target price confidence interval can vary will depending on the product being analyzed. For example, products that are near commodity-like in the market place will have a narrow price range while products that are differentiated from competitive products typically have a wide price range. A seller may have groups of product offerings that relatively similar. The attribute differences among them may be minor enough that all of the related products can share the same win probability function. Product segmentation is the process of categorizing similar products into groups for this type of analysis. How closely products are related to one another can often be shown by classifying products into a product hierarchy. For example, information technology products can be grouped into hardware versus software. Then within the hardware group it can be divided into servers versus storage. Then within storage, various brand lines can be defined—and so on until the sellable unit is defined.

In accordance with one or more embodiments, in order to facilitate determining a valuation model for a product, the segmentation component 406 can be configured to build a segmentation tree for the product based on the product components and associated attributes, the component hierarchy information provided in the clean historical data, and the model design parameters that control the segmentation tree design (e.g., regarding number of minimum components assigned to a tree node, tree pruning parameters, component hierarch related parameters, etc.). For example, with reference to FIGS. 5A-5C and chart 500, such model design rule parameters that effect segmentation tree design can include but are not limited to, design rule fields 3 and 10-13. The resulting segmentation tree can assign subsets of product components to different tree nodes according to the component hierarchy and the model design parameters (e.g., design rules 1 and 10-13). In some implementations, the segmentation component 406 can also be configured to prune the segmentation tree based on the model design parameters (e.g., design rule 12) to remove insignificant tree nodes.

Figure 6:
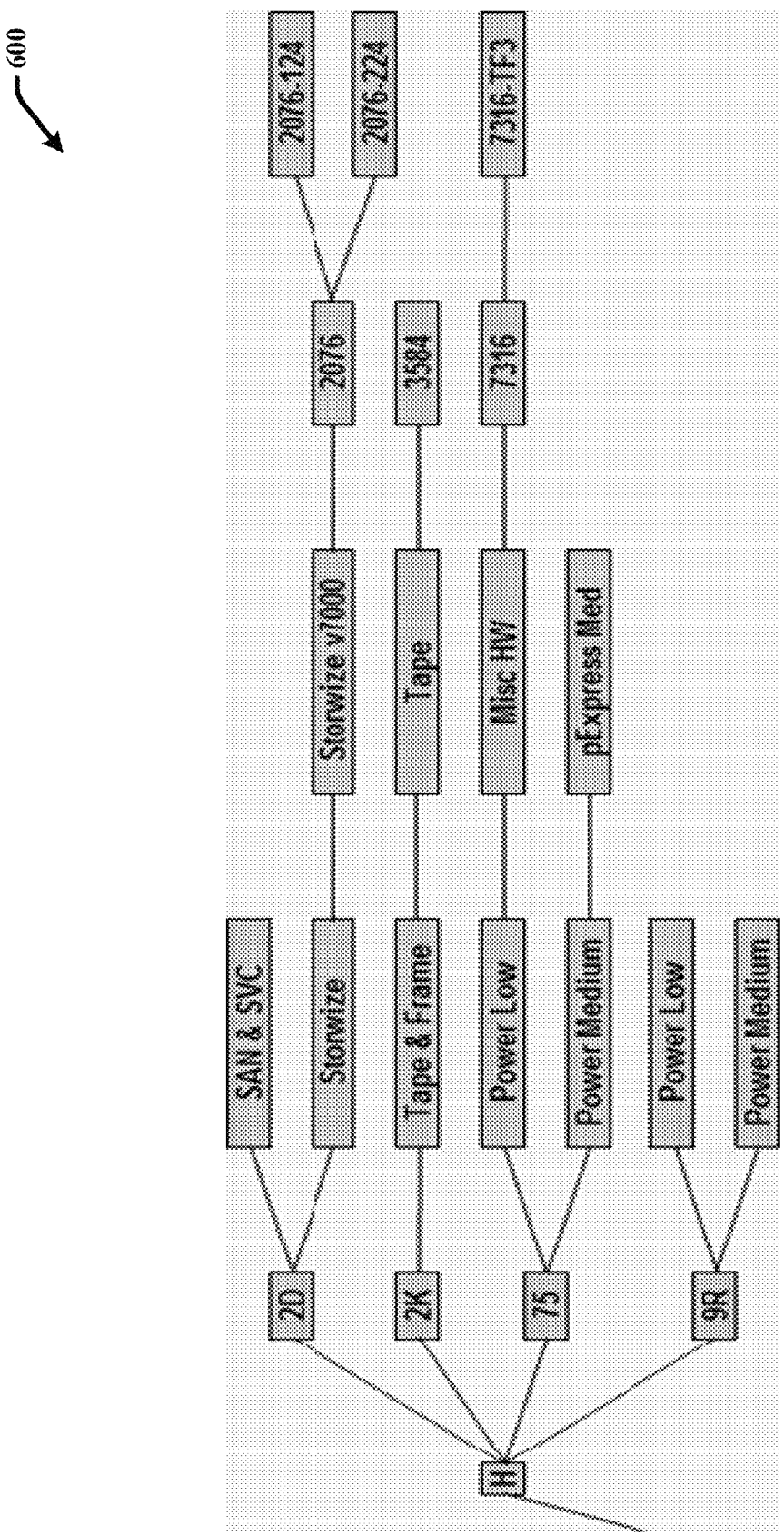
FIG. 6 provides an example illustration of a segmentation tree in accordance with one or more embodiments described herein.

FIG. 6 provides an example illustration of a segmentation tree 600 that can be generated by the segmentation component 406 accordance with one or more embodiments described herein. The segmentation tree 600 represents information technology products comprised of many different individual product components that have respectively been assigned to different nodes in the segmentation tree. For example, the segmentation tree 600 starts with the letter H on the left which represents all hardware in the product hierarchy. All hardware components sold within the time period of the analysis can be assigned to the segment H node. All hardware components in the 2D division will also be assigned to the segment node labeled 2D. All hardware, 2D products in the Storewize brand will also be assigned to the Storwize brand node. Therefore, the number of components in the nodes declines as we move towards the right in the segmentation tree 600. The branching will continue until: (1) a minimum number of components that are required to be assigned to a node is not reached, or (2) the most detailed level of product hierarchy is reached. The terminal nodes of the tree are called leaf nodes.

With reference again to FIG. 4, after the segmentation component 406 has generated the component level segmentation tree for the product, the component attribute analysis component 408 and the collective attribute analysis component 410 can be configured to respectively perform sets of linear regressions on the based on the segmentation tree. In one or more embodiments, the model creation component 404 can create the valuation model in two stages. The first stage is at the component level and the second stage is at the collective product level. In the first stage, the component attribute analysis component 408 can be configured to estimates the customer price sensitivity for each node of the segmentation tree based on the clean historical data. In the second stage, the collective attribute analysis component 410 can be configured to estimate how collective product attributes that apply to all components affect the component win probability functions created in the first stage.

With regard to the first stage, in one or more embodiments, the component attribute analysis component 408 can be configured to determine acceptance probability information for each tree node as a function of a correlated numeric attribute of the components associated with each tree node (e.g., reference/list price, cost, delegated cost, etc.). In this regard, the correlated numeric attribute can include a known parameter (e.g., cost of the component) that can be linearly correlated to the historical total value (e.g., price) of the product. By identifying a correlated parameter (like cost) for the respective components of the product, a linear regression can used to estimate quote price on future deals from the cost of those future deals. In various embodiments, the acceptance probability information can be defined in terms of three price points, the H, M and L price points respectively corresponding to a 5% win probability, a 50% win probability, and a 95% win probability. The component attribute analysis component 408 can be configured to determine these H, M and L values for each node/component in the segmentation tree. In one implementation, the component attribute analysis component 408 can determine the H, M and L values for the respective tree nodes by sorting the historical data based on the correlated numeric attribute (e.g., in ascending order as a percent of a reference price for each component), and find the 5th, 50th, and 95th percentile points. However in another embodiment, the component attribute analysis component 408 can perform a set of linear regressions to improve the H, M and L estimates for the respective tree nodes.

Figure 7:
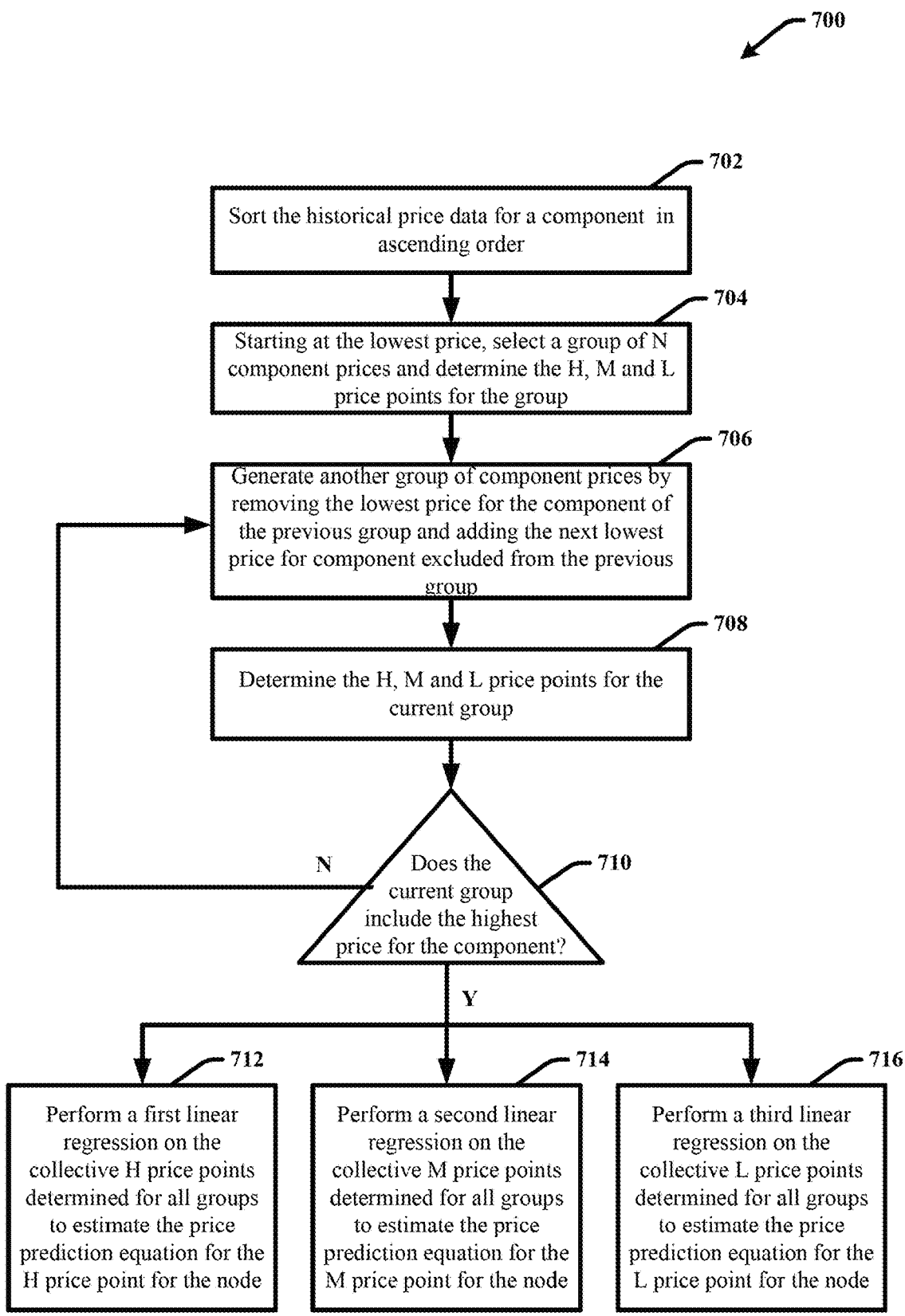
FIG. 7 provides a flow diagram of an example, non-limiting computer-implemented method for performing regressions on the component attributes to determine win probability as a function of high (H), median (M), and low (L) price points in accordance with one or more embodiments of the disclosed subject matter.

FIG. 7 provides a flow diagram of an example, non-limiting computer-implemented method 700 for performing regressions on the component attributes to determine win probability as a function of H, M and L price points (e.g., by the component attribute analysis component 408) in accordance with one or more embodiments of the disclosed subject matter. Method 700 defines a mechanism to determine a H, M and L price point for a single node in the segmentation tree. Each node can represent a subset of the product components. The minimum number of components associated with each node can be defined by the model design parameters. It should be appreciated that method 700 can be performed for all nodes in the segmentation tree to determine a H, M and L price point for each node.

At 702, the historical price data for a component/node is sorted (e.g., by the component attribute analysis component 408) in ascending order (e.g., from the highest price of component to lowest price). At 704, starting at the lowest price, a group of N number (wherein N is predefined) of component prices is selected (e.g., by the component attribute analysis component 408). For example, where N is 30, the group can include the 30 lowest prices for the component/node. The H, M, and L price points are then determined for the group such that the H price reflects a price point (as a percentage of a reference price) associated with a 5% acceptance probability, the M price point reflects a price point (as a percentage of the reference price) associated with a 50% acceptance probability, and the L price point reflects a price point (as a percentage of the reference price) associated with a 95% acceptance probability. At 706, another group of component prices is generated by removing the lowest price of the previous group and adding the next lowest price (e.g., N+1) excluded from the previous group (e.g., by the component attribute analysis component 408). At 708, the H, M and L price points for the current group are then determined. Method 700 continues by repeating 706 and 708 until the highest price for the component/node has been included in a final group. The result is several groups of prices for the component for which the H, M and L prices are determined. For example, with respect to a component having 40 different historical prices associated therewith, and wherein N is set to 30, the first group generated at 704 would include prices 1-30. The second group would include prices 2-31, the third group would include prices 3-32, and so on until the final group which would include prices 11-40.

At 710, if the current group does not include the highest price for the component, method 700 returns to 706. If however at 710 the current group includes the highest price for the component, then method 700 proceeds to determine final H, M and L price points for the component based on the collective H, M and L price points determined for all price groups (e.g., by the component attribute analysis component 408). For example, at 712, a first linear regression is performed on the collection of historical H price points to estimate the prediction equation for the H price point in the segment. At 714, a second linear regression is performed on the collection of historical M price points to estimate the prediction equation for the M price point in the segment. At 716, a third linear regression is performed on the collection of historical L price points to estimate the prediction equation for the L price point in the segment.

With reference back to FIG. 4, after the component attribute analysis component 408 has determined the H, M, L price points for all tree nodes/components based on the historical price data for the respective components, the collective attribute analysis component 410 can then determine how the collective product attributes effect these H, M and L price points for each node/component. For example, in the first stage, only the component's defined product segment and correlated price parameter have contributed to the determined H, M and L price points for a tree node. However, there are other component attributes and also quote level attributes that affect the shape of the component win probability curve and the corresponding H, M and L values. For example, other component attributes could include for example, the component's M price point (e.g., as determined by the component attribute analysis component 408 above) and the component's percent contribution to the total deal/quote size. Likewise, an example quote level attribute could include the total deal size. For example, instead of summing component list prices to calculate the deal size, the total deal size could be determined by summing up the components' M price points. This gives a better deal size estimate than using list price since some brands have much higher average discounts than others. Other collective product attributes can include but are not limited to: log of total deal size, channel (e.g., dummy variable where 1=indirect, 0=direct), end of quarter close (e.g., a dummy variable where 1=last month of quarter, 0=other months), industry group (e.g., a dummy variable where 1=gov't or education, 0=all else), customer's propensity to close (e.g., a dummy variable where 0=low, 1=high), Watson business justification text value (e.g., a number between 0 and 1 representing justification strength), and the like.

In one or more embodiments, the collective attribute analysis component 410 can be configured to perform multiple additional linear regressions to estimate how these additional component attributes and one or more of the collective product attributes affect win probability and therefore the three price points (e.g., the H, M, and L) for each node/component. The additional component attributes and one or more collective product attributes that are evaluated by the collective attribute analysis component 410 can be defined by the model design parameters. The collective attribute analysis component 410 can further modify the H, M and L price points for each node/component to reflect how these additional component attributes and/or collective product attributes affect acceptance probability. In some embodiments, the collective attribute analysis component 410 can be configured to limit its analysis to just the M price points. For example, the collective attribute analysis component 410 can be configured to perform a regression on the components in each node/component of the segmentation tree to predict how the component M price point is affected by the collective product attributes. In one or more embodiments, the regressions performed by the collective attribute analysis component 410 are defined by the following EQUATION 3:

$$y_i = \beta_1 x_{i1} | \ldots | \beta_p x_{ip} | \varepsilon_i \quad \text{EQUATION 3}$$

Wherein,
$y_i$ = actual historical price of component i,
$x_{i1}$ = value of attribute 1 (out of p total number of attributes) of components i,
$\beta_1$ = estimated regression parameter of attribute 1 (out of p total attributes), and
$\varepsilon_i$ = the error term value.

In various implementations, the collective attribute analysis component 410 can estimate the $\beta$ parameters using multiple ordinary least squares (OLS) regressions on the historical data in each node of the segmentation tree.

The adjustment component 412 can be configured to further adjust the H, M and L price points for each tree node/component based on one or more additional factors, including but not limited to: potential bias in the historical data, bias associated with using win data only, a brand strategy associated with the product, and the like. For example, regarding potential bias in the historical data, the multiple linear regressions of EQUATION 3 above are trying to predict the actual historical price ($y_i$) of the component based on the input attribute values. The error term $\varepsilon_i$ is minimized in the regression with a mean of zero. This implies that the predicted price of the regression formula is an estimate of its mean average price given all of the input values.

For the purposes of calculating the acceptance probability function, the M price should be moved based on the regression along with the L and H points already calculated. The mean value from the regression can be converted to the M value needed by applying an adjustment. If the original M price is exactly in the middle between the H and L price, then the curve is symmetric and the regression predicted mean price can be substituted for the original median price. If however, the original M price is not in the middle, then the curve is asymmetric and the regression mean price must be adjusted to determine the M price needed. In one or more embodiments, the adjustment component 412 can be configured to determine the factor value to adjust the mean to M value in the original win probability function. The adjustment component 412 can further apply this factor value to the mean value from the regression to convert it to the needed M value according to the following EQUATION 4:

$$L_1 = L_0$$

$$M_1 = \text{Mean}_{Regression}(\text{e.g., Median}_0/\text{Mean}_0)$$

$$H_1 = H_0 \quad \text{EQUATION 4}$$

Wherein,
Subscript 0=original calculated price point
Subscript 1=price point after first adjustment
Subscript n=price point after $n^{th}$ adjustment.

Regarding, bias associated with using only win data, in order to eliminate potential contamination of losing transaction data, the valuation model generation component 106 uses only historical data including product proposals/quotes that were accepted to generate and evaluate valuation models. An added benefit of using winning quotes is that the losing quotes can be ignored and no effort is wasting cleansing the losing quote data. However, using only win data may introduce an estimation bias in the model. For example, the win probability curve represents the actual maximum prices the customer is willing to pay. A deal wins when it is priced at or below the maximum price the customer is willing to pay and therefore understates the actual win probability curve. Given that the acceptance probability function is a cumulative probability function of maximum prices customers in the segment are willing to pay and sellers intrinsically try to set prices close to but not exceed customer maximum prices, the historical winning price data encodes prices that approximate the win probability function, but somewhat lower. Because the winning data may be biased low, the adjustment component 412 can be configured to adjust the H, M and L price points to reflect an estimated actual maximum price a customer was willing to pay. In one or more embodiments, the adjustment component 412 can use a Monte Carlo simulation can to estimate actual maximum price data regarding actual maximum prices customers would have been willing to pay for a winning quote. The adjustment component 412 can further generated a bias adjustment factor based on the difference between the historical winning price and the estimated actual maximum price. The adjustment component 412 can further adjust (e.g., increase) the respective H, M and L price points based on the bias adjustment factor according to the following EQUATION 5:

$$L_2 = L_1 \cdot (\text{Bias Adjustment Factor})$$

$$M_2 = M_1 \cdot (\text{Bias Adjustment Factor})$$

$$H_2 = H_1 \cdot (\text{Bias Adjustment Factor}). \quad \text{EQUATION 5}$$

In accordance with past Monte Carlo simulations regarding customer accepted price and actual maximum price the customer was willing to pay, the typical bias adjustment factor is about 1.1. Thus in some implementation, the adjustment component 412 can be configured to apply a predefined value (e.g., 1.1) for the bias adjustment factor and skip determining the bias adjustment factor using the Monte Carlo simulation.

With regard to brand adjustment, the product segments defined in the market segmentation tree are managed by brand executives. Typically, they have a brand strategy that reflects how they expect to compete in the marketplace. The valuation model is built on the historical data, but the future brand strategy may have changed since then. The adjustment component 412 can thus further provide for optional brand adjustment that allows the brand to effectively move the win probability curve to the right or left on any specific segment defined in the tree. The input values used by the adjustment component 412 to adjust the H, M and L values associated with a component (or the entire quote H, M and L price) can be provided to the valuation model generation component 106 (e.g., by a user). For example, if the brand executive feels that the changes in the marketplace have resulted in customer's willingness to pay a premium versus the past, they could input a positive adjustment value. For example, using 0.01 would indicate that a price increase of 1% will have no effect on win probability compared to the past history. If the brand executive feels that the marketplace has become more competitive, they could input a negative adjustment value. For example, using −0.02 would indicate that a price decrease of 2% will have no effect on win probability compared to the past history. The default value for this adjustment is zero and it will generate the same win probability in the future as the past.

The optional brand adjustment factor is stored on each component in the component segmentation tree. The following EQUATION 6 can be used by the adjustment component 412 to generate for optional brand adjustment:

$L_3 = L_2 \cdot$ (Optional Brand Adjustment Factor)

$M_3 = M_2 \cdot$ (Optional Brand Adjustment Factor)

$H_3 = H_2 \cdot$ (Optional Brand Adjustment Factor). EQUATION 6

The net result of the various adjustments performed by the adjustment component 412 is the generation of updated H, M and L price points for the respective nodes/components of the segmentation tree.

In one or more embodiments, the model creation component 404 can be configured to generate a final valuation model for the product based on: 1. the segmentation tree generated by the segmentation component 406, 2. the component attribute regressions performed by the component attribute analysis component 408, 3. quote level attribute regressions performed by the collective attribute analysis component 410, and 4. adjustments to the H, M, L values determined by the adjustment component 412. In one or more embodiments, the valuation models generated by the model creation component can be configured to determine valuation information for the product which include a H value (e.g., determined based on the collective H values for each node of the segmentation tree), a M value (e.g., determined based on the collective M values for each node of the segmentation tree), and a L value (e.g., determined based on the collective L values for each node of the segmentation tree) for the product.

The valuation models can also determine a target value for the product. In particular, the valuation models can combine the acceptance probability function (EQUATION 1 above) with the profit contribution function to create the expected profit contribution function, EQUATION 2 above. The valuation models can further determine the target price by maximizing the expected profit contribution function (EQUATION 2). For example, the valuation model can use the adjusted H, M and L values determined by the adjustment component 412 as input to the win probability function (EQUATION 1 above). The valuation model can further employ the output of the acceptance probability function as input to the target pricing calculation. As the quote price changes, the profit contribution (price–cost) changes as does the win probability (as a function of price). In one or more embodiments, the maximizing of the expected profit contribution function (EQUATION 2) is performed by the model creation component 404 using a numeric method that quickly finds the maximum value of this concave down function. Once the target price is found, a call to the win probability function returns the odds of winning.

Figure 8:
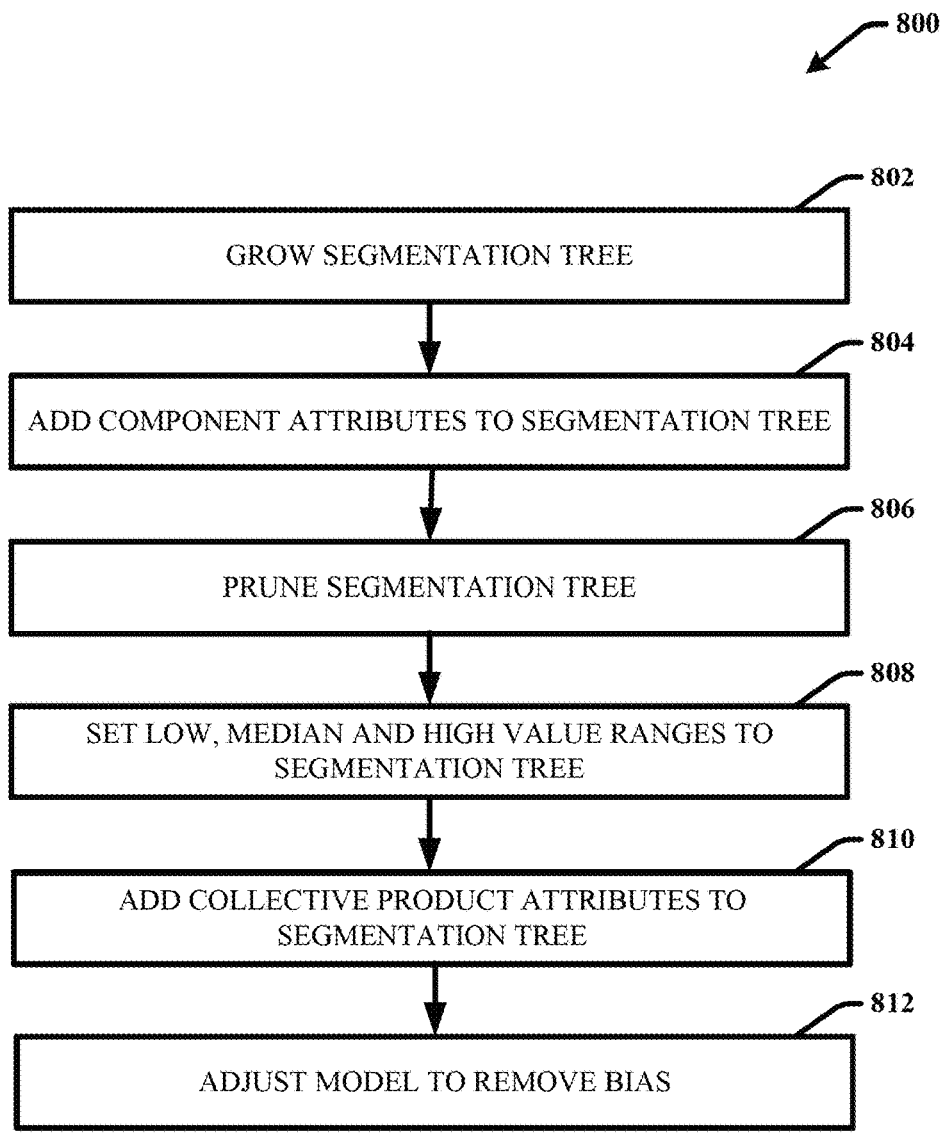
FIG. 8 provides a flow diagram of an example, non-limiting computer-implemented method for generating valuation models in accordance with one or more embodiments of the disclosed subject matter.

FIG. 8 provides a high level flow diagram of an example, non-limiting computer-implemented method 800 for generating valuation models in accordance with one or more embodiments of the disclosed subject matter. Method 800 provides a high level summary of the various functions performed by the model creation component 404 to create a valuation model for a product. The model creation component 404 calls several functions and machine learning algorithms to build a valuation model based on a set of design parameters for the product and a subset (e.g., the training set) of the clean historical data 204. Repetitive description of like elements employed in other embodiments described herein is omitted for sake of brevity.

With reference to method 800, at 802, the model creation component 404 grows the segmentation tree (e.g., using segmentation component 406). At 804, component level models are added to the segmentation tree (e.g., using the component attribute analysis component 408). At 806, the segmentation tree can be pruned. For example, in some implementations, the segmentation tree is constrained (e.g., by the model design parameters) in that each node must contain a minimum number of components to be allowed. According to these implementations, the segmentation component 406 can be configured to build the segmentation tree and then prune it back to remove leaf nodes that don't improve the tree's statistics. At 808, the L, M and H value ranges can be added to the respective nodes of the segmentation tree. At 810, the quote level models can be added to the segmentation tree (e.g., using the collective attribute analysis component 410), and at 812, the model can be adjusted to remove bias (e.g., using the adjustment component 412).

FIG. 9 illustrates a block diagram of an example, non-limiting subsystem 900 that facilitates evaluating potential valuation models in accordance with one or more embodiments of the disclosed subject matter. In one or more embodiments, subsystem 900 is a subsystem of system 100 (e.g., system 100 can include subsystem 900). Subsystem 900 can include the same or similar features and components as subsystem 400 with the addition of evaluation component 902, model fit statistics data 904, and valuation model selection/optimization component. Subsystem 900 further includes valuation model database 110. Repetitive description of like elements employed in other embodiments described herein is omitted for sake of brevity.

In some embodiments, the model creation component 404 can be configured to split the clean historical data 204 into two sets, referred to herein as the training set and the test set. According to these embodiments, the model creation component 404 can be configured to generate the potential valuation model data 414 based on only the training set. For example, the potential valuation model data 414 can include different valuation models generated by the model creation component 404, their respective model design parameters and their respective segmentation trees. Based on the different design parameters, the respective models may differ in component segmentation tree design, collective product level attributes considered, and the like. The respective models will thus also likely vary with respect to the determined H, M, L values and associated target price. The test set data can then be used by the valuation model generation component 106 to evaluate the potential the different valuation models and select the best valuation model to store (e.g., in the valuation model database 110) and employ for future evaluation of similar products.

In order to facilitate selecting the best model, the evaluation component 902 can be configured to evaluate each of the different valuation models included in the potential valuation model data 414 using the test set portion of the clean historical data 204. In one or more embodiments, the evaluation component 902 can be configured to score each potential valuation model based on evaluation of the respective models using the test set port of the clean historical data. This evaluation process involves generating fit statistics data for the different valuation models based on the test data. This approach is significant because the model will not have been built using test data and therefore it is "unseen" data to the model. Thus fit statistics generated from the test set are considered unbiased and therefore the best model fit estimates. These fit statistics are identified in system 900 as model fit statistics data 904. In some embodiments, the fit statistics determined for each model can be stored with information identifying the model and the design parameters for the model. For example, as shown in chart 500, the fit statistics can be included in the model design parameters file for a particular model (e.g., as items 19-25).

Several model fit statistic measures can be created for the purpose of evaluating the valuation models so the best can be selected. With reference back to FIG. 5A, as previously noted, the values for the design rule fields 20-25 can be determined by the evaluation component 902. These design rule fields 20-25 represent example fit statistics that can be determined by the evaluation component 902 based on evaluation of the model using the test data.

For example, design rule field 20, Rsquared, corresponds to R-squared or coefficient of determination. This statistic indicates how much of the variability in the actual historical quote prices can be explained by the model's predicted quote prices. For example, a value of 0.8 would indicate that the model explained 80% of the variation. The goal is to get the Rsquared value as close as possible to 100%. Design rule field 21, RMSE, corresponds to root mean squared error. This measures the error between the actual historical price and the model's predicted price. The statistic squares the error of each observation, finds the mean average of these squared errors, then takes the square root of that average. The goal is to get the RMSE value to as close to zero as possible. Design rule field 22, MAPE, corresponds to mean absolute percentage error. This measures the error between the actual historical price and the model's predicted price. The statistic takes the absolute value error of each observation, calculates the error as a percentage of the actual historical price, then finds the mean average percentage error for all observations. The goal is to get the MAPE value to as close to zero as possible. Design rule field 23, EGPP, corresponds to expected gross profit improvement percentage. This is an overall percent increase measurement of how much of an improvement in expected gross profit would have resulted in using the model for pricing instead of the historical price. A value of 0.5 for example, would indicate that the model target prices instead of the historical prices would have generated 50% more gross profit dollars. The accuracy of this value requires that the model has good fit statistics. Design rule field 24, avg_quote_disc, corresponds to the average quote discount. This is a simple average discount of the quote price to list price for all components in the historical data test set. Design rule field 25, avg_opt_prc_disc, corresponds to average target price discount. This is a simple average discount of the target price to list price for all components in the historical data test set. This measures show if the valuation model is significantly affected average discount levels. Typically, this value should be fairly close to the average quote discount.

In some embodiment, the fit statistics determined for each potential valuation model can be presented to a user (e.g., the operator) for manual evaluation of the respective fits statistics. The user can further select the best valuation model based on manual evaluation of the respective fit statistics. In other embodiments, the selection and optimization component 906 can be configured to evaluate the respective fit statistic determined for each valuation model and select the valuation model that has the best fit statistics. For example, as described above, the target value for Rsquared can be 100% and the target values for RMSE and MAPE can be 0%. According to this example, the selection and optimization component 906 can be configured to select the model whose fit statistics are closest to the target values. Each fit statistic used can thus be associated with a predetermined target value. In some embodiments, the selection and optimization component 906 can generate a score for each of the models that reflect a degree to which each of the model's fit statistics values differ from the target values for the respective fit statistics. According to this embodiment, the selection and optimization component 906 can be configured to select the model having the best score. For example, a valuation model having perfect fit statistics that match the optimal target value can receive a score of 100%. As the respective fit statistics determined for a valuation model deviate from their target values, the model's score can decrease. In some implementations, different fit statistics can be weighted differently based on their impact on the accuracy of the model's valuation accuracy.

In some embodiments, after a particular valuation model has been selected (e.g., either manually or by the selection and optimization component 906), the selection and optimization component 906 can be configured to optimize the selected model based all the clean historical data 204, including the training set data and the test set data. According to these embodiments, the selection and optimization component 906 can direct the model creation component 404 to re-generate the valuation model based on the set of design parameters defined for the model and all the clean historical data 204 (e.g., the training set and test set). The resulting optimized or updated valuation model along with its set of model design parameters can then be stored in the valuation model database 110.

Figure 10:
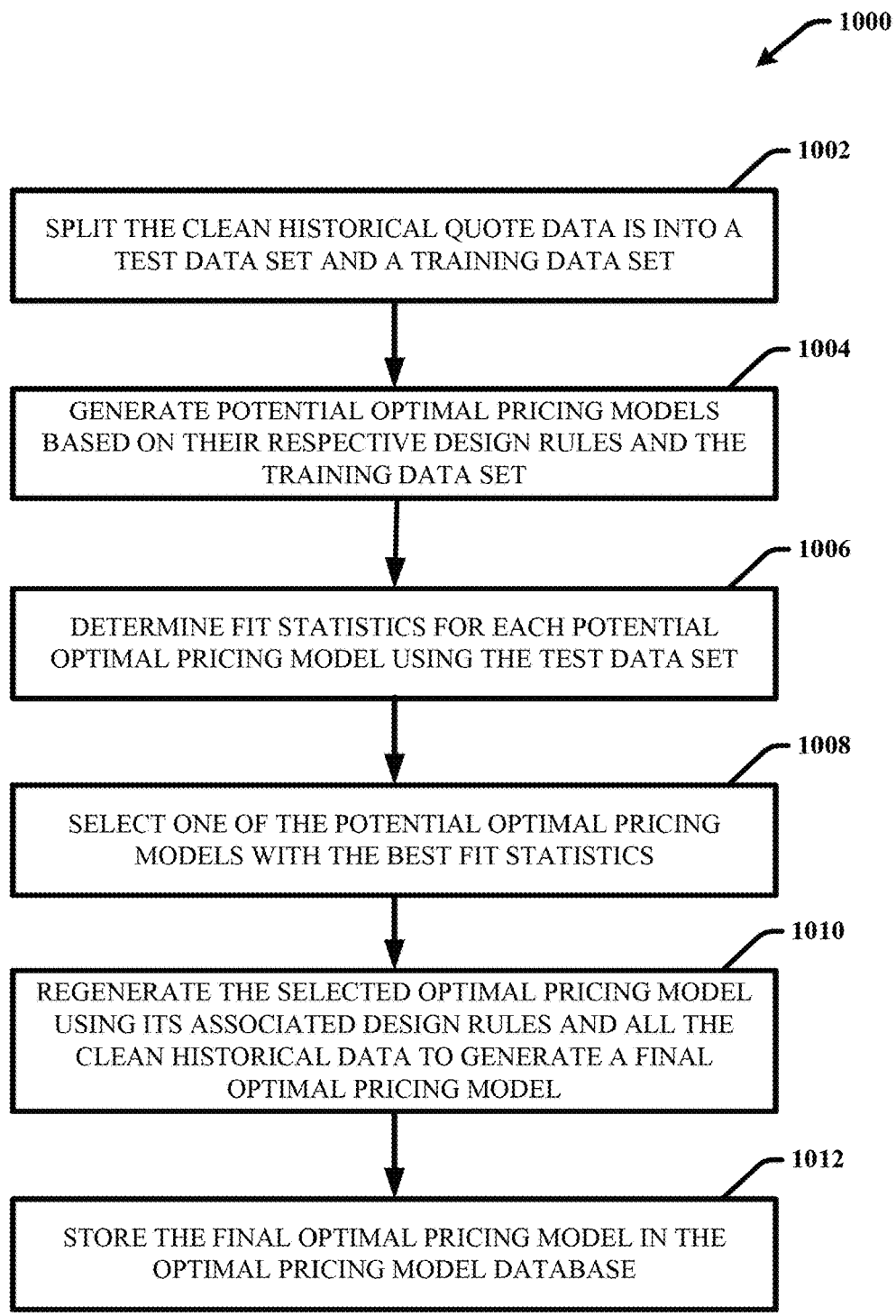
FIG. 10 provides a flow diagram of an example, non-limiting computer-implemented method for evaluating potential valuation models in accordance with one or more embodiments of the disclosed subject matter.

FIG. 10 provides a flow diagram of an example, non-limiting computer-implemented method 1000 for generating and evaluating potential valuation models in accordance with one or more embodiments of the disclosed subject matter. One or more aspects of method 1000 can be performed by the valuation model generation component 106 using the model creation component 404, the evaluation component 902 and the selection and optimization component 906.

At 1002, the clean historical data is split into a test data set and a training data set (e.g., by the valuation model generation component 106). At 1004, potential valuation models are generated based on their respective design parameters and the training data set (e.g., by the model creation component 404). At 1006, fit statistics for each potential valuation model are determined using the test data set. At 1008, one of the potential valuation models with the best fit statistics is selected. At 1010, the selected valuation model is regenerated using its associated design parameters and all the clean historical data to generate a final valuation model. At 1012, the final valuation model is stored in the valuation model database.

The various techniques used by the valuation model generation component 106 to generate valuation models provide several advantages over previous target pricing analytical tools. For example, the subject modeling techniques require only historical win data for winning product proposal quotes and therefore eliminate significant challenges associated with cleaning up and historical loss data. Further, the subject valuation models can be designed, evaluated, and deployed very quickly. In particular, the valuation model generation component 106 allows the model designer to quickly define several model designs and then the valuation model generation component 106 builds and evaluates the statistics of those designs. The model designer or the valuation model generation component 106 (e.g., via selection and optimization component 906) can then quickly and/or automatically select the valuation model design that works best. For example, the valuation model generation component 106 is based on a standard framework. However, within that framework there is flexibility in the specific model design. For example, the mathematical models defined using the techniques described herein similar enough to allow automation of the model creation. Individual models designs are set by the model designer and may differ in component segmentation tree design, collective product attributes used, etc. This allows the model designer to define several model design approaches in a single file. The valuation model generation component 106 will then break up the input historical data into training and test sets and automatically build a separate model for each design and then evaluate each model against the test set. The model evaluation statistics are stored with each model design and the model designer can then use the statistics to compare and select the most appropriate model. This approach is intended to reduce the model building process from months to days.

Figure 11:
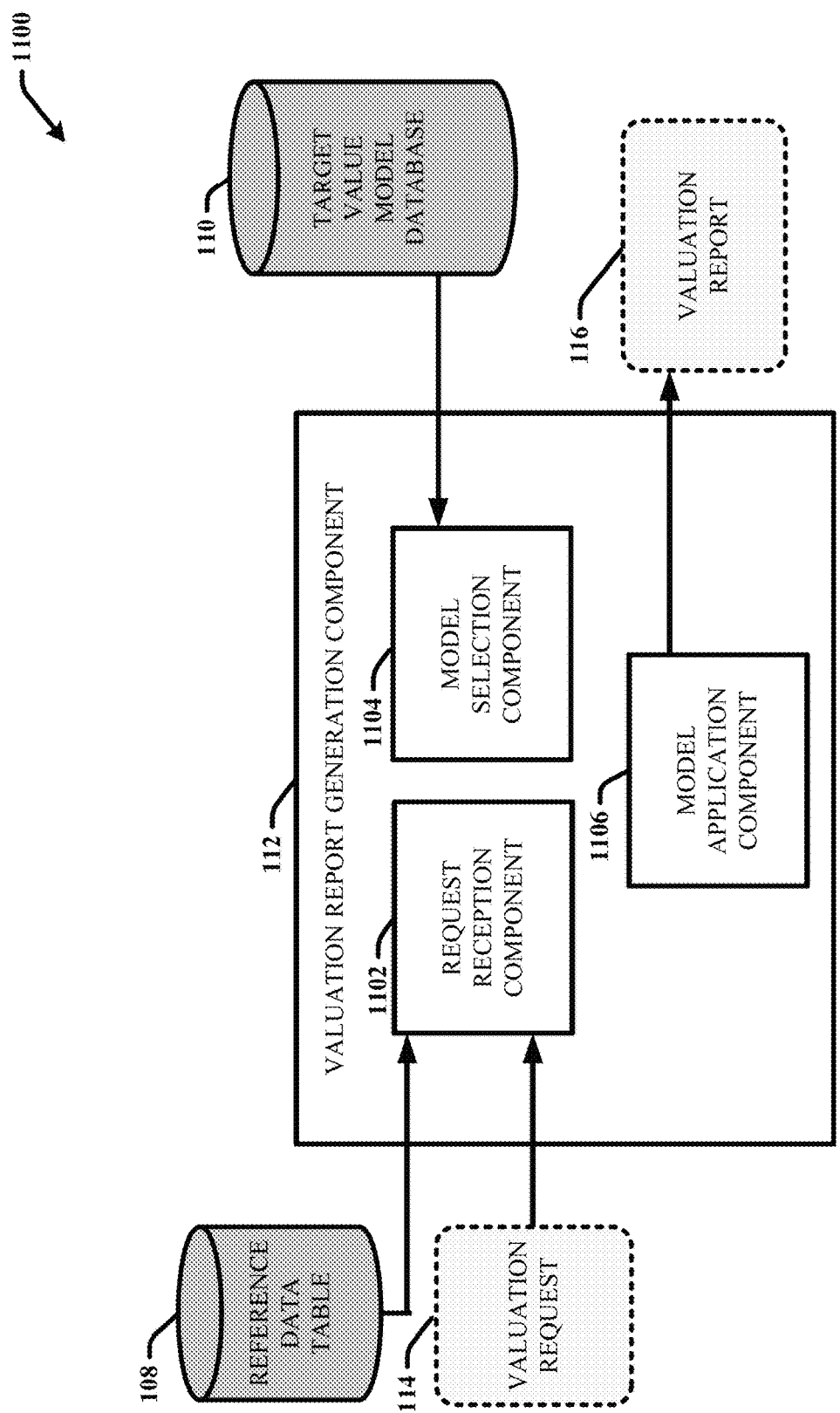
FIG. 11 illustrates a block diagram of an example, non-limiting subsystem that facilitates generating a valuation report for a package of multiple components in accordance with one or more embodiments of the disclosed subject matter.

FIG. 11 illustrates a block diagram of an example, non-limiting subsystem 1100 that facilitates generating a valuation report for a package of multiple components in accordance with one or more embodiments of the disclosed subject matter. In one or more embodiments, subsystem 1100 is a subsystem of system 100 (e.g., system 100 can include subsystem 1100). For example, subsystem 1100 includes a subset of the components and databases of system 100, including the valuation report generation component 112, the reference data table 108, and the valuation model database 110. Repetitive description of like elements employed in other embodiments described herein is omitted for sake of brevity.

Subsystem 1100 is particularly directed to the features and functionalities of the valuation report generation component 112. In one or more embodiments, the valuation report generation component 112 can be configured to automatically generate a valuation report 116 for a product using a valuation model included in the valuation model database 110 generated by the valuation model generation component 106 for a same or similar product. For example, the valuation report generation component 112 can accept a valuation request 114 that represent a request for a valuation report 116 for the product. The valuation report 116 can include a variety of rich valuation information, such as an estimated target value or price for the product, different price points for the product (e.g., H, M and L price points), acceptance probability information, confidence interval information, and the like. The valuation request 114 will contain at least some product information with details about the product for which a valuation report is requested. For example, the product information can include but is not limited to: information identifying the product or quote type for which the quote is to be prepared, information identifying the components of the product, identifying the component attributes, information identifying the component hierarchy, information identifying the collective product attributes and the like. In some implementations, the valuation request 114 can include information identifying the particular valuation model (e.g., a model ID number, design number, etc.) to be used for determining the valuation report.

The valuation report generation component 112 can include request reception component 1102 to receive and initiate processing of valuation requests. For example, in various embodiments, the request reception component 1102 can be configured to receive valuation requests (e.g., valuation request 114) in the form of an API call from another system, application or device. Based on reception of a valuation request 114, in some implementations, the request reception component 1102 can evaluate the request to determine if certain necessary product data that is required as input into the valuation model for the product is missing from the request (e.g., component hierarchy information, component reference price information, etc.). The request reception component 1102 can further access the reference data table 108 to retrieve and fill in the missing product data.

In embodiments in which the valuation model database 110 comprises a plurality of different valuation models, the model selection component 1104 can be configured to select an appropriate valuation model for applying to the request based on the product information included in the request. For example, the valuation model database 110 can include different models for a same or similar product, wherein each of the different models are associated with a different geographic region, customer type, brand, or other type of significant quote level attribute. In another example, the valuation model database 110 can include different target pricing modes for a variety of different products. According to these embodiments, the model selection component 1104 can use the information included in the valuation request to identify and select the appropriate valuation model from the valuation model database.

The model application component 1116 can then apply the product information to the appropriate valuation model to generate the valuation report 116. The valuation report generation component 112 can further provide the requesting user (e.g., via the requesting application/device) with the resulting valuation report 116 in a suitable format (e.g., in a report including a chart, a table, a graph, etc.). The valuation report 116 information helps a seller to know what the target price would be based on the historical data and is intended to influence their pricing decision.

The valuation report 116 can include a variety of rich valuation information. For example, the valuation report 116 can include a target price determined for the product based on the product information and valuation model applied to the product information. As described supra, the valuation model can be configured to determine the target price for the product based on an acceptance probability function that reflects a probability a reference price for the product can be accepted for purchase based on different price points determined for the product as a percentage of the reference price. The different price points are determined based on correlated numeric attributes, in the historical data, for the respective components. The valuation model further determines the target price by maximizing the expected profit contribution function that determines an expected profit contribution as a function of profit contribution and win probability (e.g., EQUATION 2).

In addition, the valuation report 116 can include information regarding the market segment the H, M, and L price points determined for the product/quote. This H, M and L price point information can be helpful to the negotiation process. The valuation report 116 can also include target price confidence interval information. The target price confidence interval information can demonstrate how deviations from the target price will affect win profitability. The confidence interval is defined by a lower price limit (e.g., the L price points) and higher price limit (e.g., the H price point). If the deal is priced within the confidence interval limits, the expected profit contribution of the deal will not be less than a specified percent the target price expected profit contributions (e.g., within 95%). In particular, the target price confidence interval is the price range around the target price that will deliver at least x percent (typically 95%) of the target price's expected profit contribution.

The valuation report 116 can also include line item versus bottom line target pricing. For example, the valuation model calculates the target prices and associated confidence intervals for each component of the quote. This approach supports the concept of the customer choosing which of the components in the quote can be purchased. This is sometimes called line item cherry picking where the buyer selects some components for purchase, but does not buy other components. The confidence intervals are therefore defined uniquely for each component. If the potential buyer has the option to selectively purchase individual components in the quote and is not obligated to purchase the entire quote, this constitutes a line item proposal. Sometimes the terms and conditions offered by the seller for the quote will not allow cherry picking, but require the customer to buy the entire quote contents in order to qualify for the pricing. This approach is sometimes called bottom line or all or nothing pricing. The valuation model will generate different valuation information depending on whether the quote is proposed as a line item or bottom line transaction.

The bottom line target price can be determined by summing the H, M and L prices of all of the components to create a total quote H, M and L price. These price points along with the total quote cost are used by the valuation model to determine the bottom line target price. The target price for a bottom line quote is generally not the same as the sum of the target prices of the components of a line item quote. In fact, the target price is generally higher for a line item quote with a higher expected gross profit. The reason for this is because in a line item quote, some products may not be favored in the marketplace and win probabilities at target prices may be relatively low. These components may easily be rejected by a buyer in a line item quote. However in a bottom line quote, the entire quote must be discounted enough to entice the customer to accept all line items, including those that would have been rejected in a line item quote. The general overall effect is that there is higher expected profit contribution in a line item quote versus the equivalent bottom line quote. The target price of a bottom line quote is calculated based on the total quote cost and the total quote summed H, M, L component price points.

Figure 12:
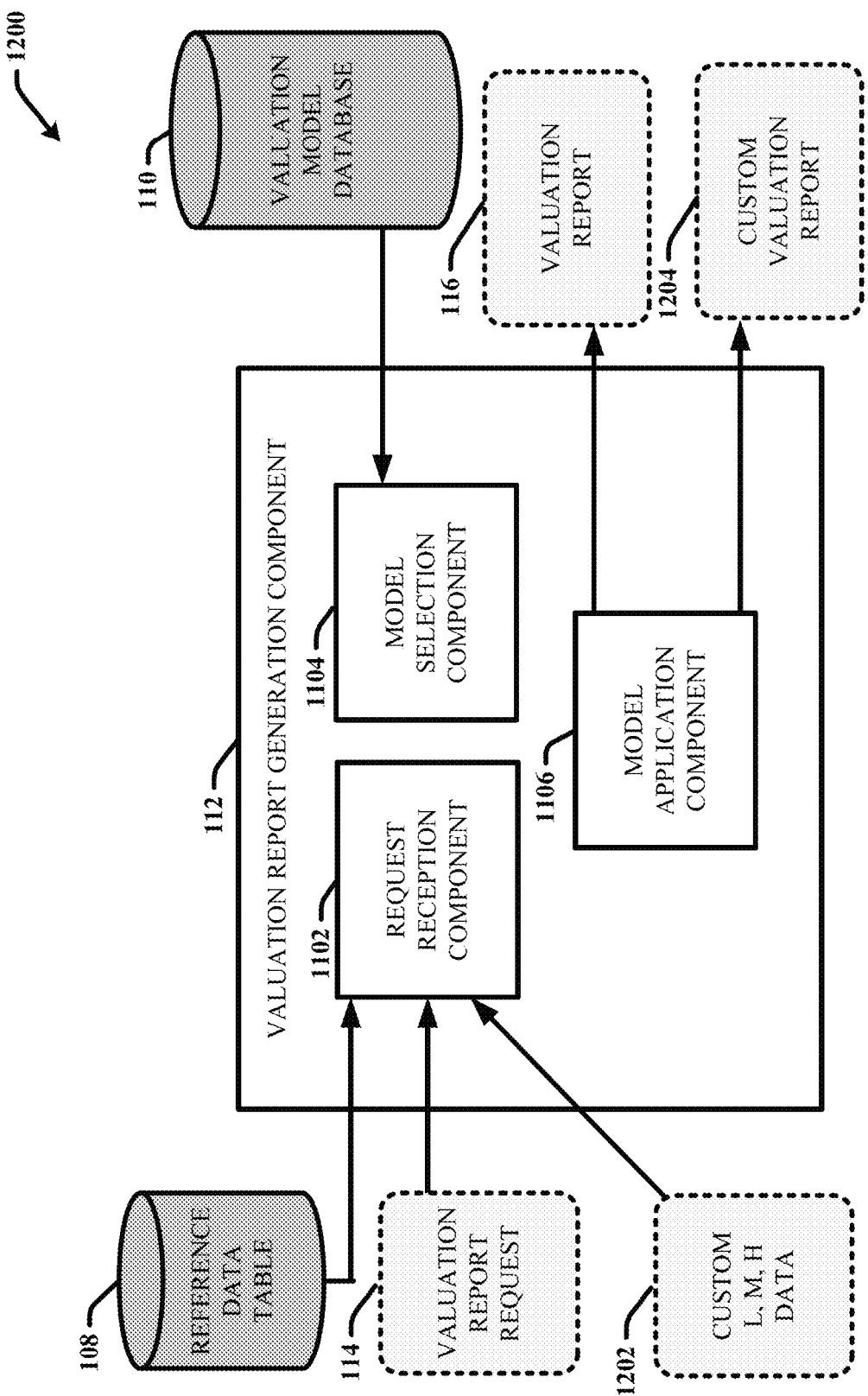
FIG. 12 illustrates a block diagram of an example, non-limiting subsystem that facilitates generating a customized valuation report for a package of multiple components in accordance with one or more embodiments of the disclosed subject matter.

FIG. 12 illustrates a block diagram of an example, non-limiting subsystem that facilitates generating a customized valuation report for a package of multiple components in accordance with one or more embodiments of the disclosed subject matter. Repetitive description of like elements employed in other embodiments described herein is omitted for sake of brevity.

Subsystem 1200 demonstrates another functionality provided by the valuation report generation component 112 referred to herein as customized valuation. In addition to the target price, the valuation model can be configured to generate the historical price range for the entire quote (e.g., the H, M and L price points). If the seller is working with the customer (as opposed to simply responding to a request for proposal (RFP)), they may review the valuation report 116 and determine that the historical price range does not match their particular sales situation. If this is the case, the seller can create a customized estimate of the price range by providing input that sets H, M and L price points chosen by the user (e.g., the seller). This custom L, M, H data 1202 can be provided to the valuation report generation component 112. The valuation report generation component 112 can then re-run the valuation model by equitably allocating these bottom line numbers to the line items so that each component will have updated H, M and L price points. In particular, the subject valuation models evaluate H, M and L price points on the component level, so when the seller provides bottom line H, M and L price points, they must be allocated to each of the components in an equitable manner. This is done by first understanding that based on the segmentation tree model, each component will already have calculated H, M and L and list (or reference) price points. By summing these H, M and L component price points, it is possible to determine the total quote H, M and L, and list price points. Then linear interpolation is used to convert the seller submitted bottom line H, M and L price point to its equivalent component H, M and L price point. Once the new component level price points are established, the valuation report generation component 112 can determine new target prices and acceptance probabilities based on the custom L, M, H data 1202. The results are returned to the requestor and customized target pricing is provided via a custom valuation report 1204.

FIG. 13 provides a chart 1300 including example valuation report information that can be generated by the valuation report generation component 112 in accordance with one or more embodiments described herein. Chart 1300 presents both an example of the valuation report 116 and the custom valuation report 1204. The valuation information for the valuation report 116 includes the H, L and M price range for the product based on market segmentation. This assists the sales representative in the negotiation process. The valuation information for the custom valuation report 1204 includes the user provided H, L and M price range for the product. The valuation information for each report includes a line item valuation and a bottom line valuation. For each of the valuation report 116 line item and bottom line valuation, and the custom valuation report 1204 line item and bottom line valuation, and the valuation report information further includes the target price (e.g., the optimal price) for the product as well win probability (e.g., acceptance probability), profit contribution, expected profit contribution and low and high confidence interval information.

FIG. 14 provides an example illustration of a valuation confidence interval chart 1400 that can be generated by the valuation report generation component 112 in accordance with one or more embodiments described herein. The confidence interval is defined by a lower price limit and higher price limit. The confidence interval is determined in two parts, the price below the target price and the price above the target price. The confidence metric values can be coded to indicate the quality of the confidence metric. For example, in the embodiment shown, the proposed prices in the lighter colored target zone 1401 are essentially similar to the target price, wherein the changes in win odds are counter-balanced by changes in gross profit. Proposed prices in the darker areas outside the target zone 1401 are significantly worse than the target price. In one or more implementations, the target zone 1401 can be determined by employing a numerical method that searches to the left of the target price to find the price that delivers x percent of the target price's expected profit contribution. Then a numerical method is used that searches to the right of the target price to find the price that delivers x percent of the target price's expected profit contribution. These two price points represent the edges of the target zone 1401 confidence interval. If the product is priced within the target zone 1401, the expected profit contribution of the product will not be less than a specified percent the target price expected profit contributions (e.g., within 95%).

Figure 15:
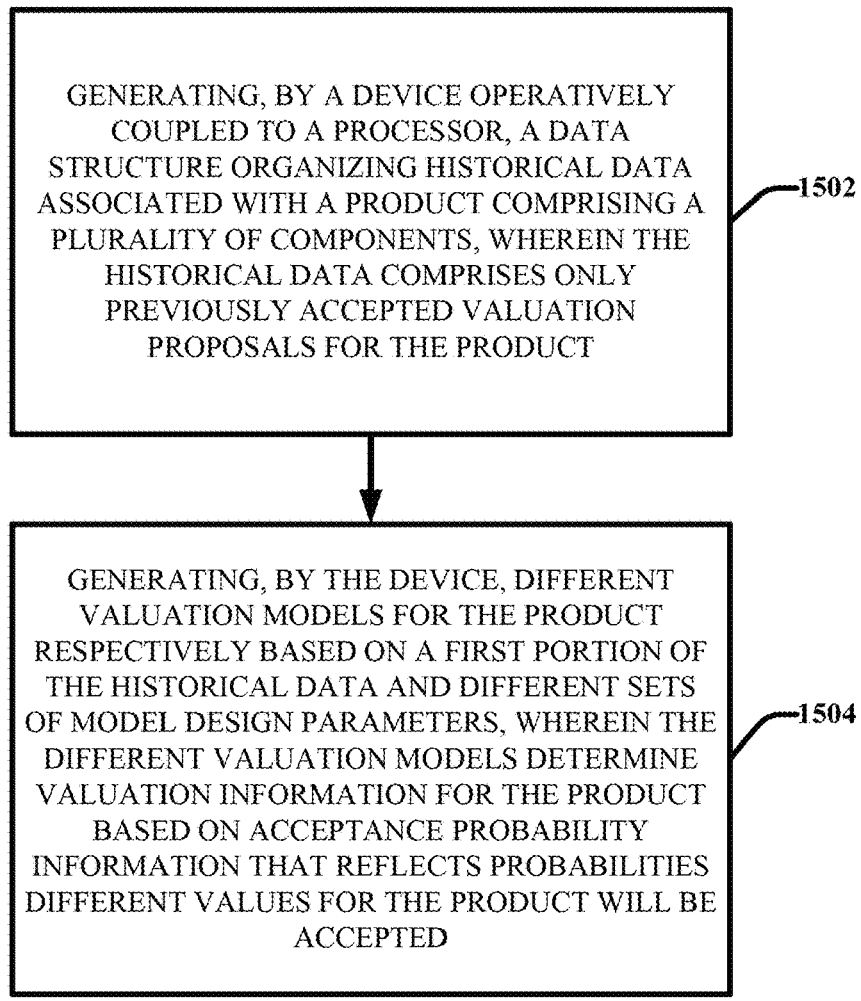
FIG. 15 illustrates a flow diagram of an example, non-limiting computer-implemented method that facilitates determining valuation information for a product in accordance with one or more embodiments of the disclosed subject matter.

FIG. 15 illustrates a flow diagram of an example, non-limiting computer-implemented method 1500 that facilitates determining valuation information for a product in accordance with one or more embodiments of the disclosed subject matter. Repetitive description of like elements employed in other embodiments described herein is omitted for sake of brevity.

At reference numeral 1502, a device operatively coupled to a processor (e.g., subsystem 900), generates a data structure organizing historical data associated with a product comprising a plurality of components, wherein the historical data comprises only previously accepted valuation proposals for the product (e.g., via data indexing/cleansing component 202). At 1504, the device generates different valuation models for the product respectively based on a first portion of the historical data and different sets of model design parameters (e.g., via model creation component 404), wherein the different valuation models determine valuation information for the product based on acceptance probability information that reflects probabilities different values for the product will be accepted.

FIG. 16 illustrates a flow diagram of another example, non-limiting computer-implemented method 1600 that facilitates determining valuation information for a product in accordance with one or more embodiments of the disclosed subject matter. Repetitive description of like elements employed in other embodiments described herein is omitted for sake of brevity.

At 1602, a device operatively coupled to a processor (e.g., subsystem 1200) receives a valuation request for a product, wherein the valuation request comprises product information identifying the product and respective components of the product. At 1604, the device determines valuation information for the product based on the product information using a valuation model generated for the product (e.g., using the model application component 1106). The valuation model was generated (e.g., by the valuation model generation component 106) based on historical data comprising only previously accepted valuation proposals for same or similar products and different values for the product determined based on the historical data and an acceptance probability information function that determines the different values based on probabilities the different values will be accepted.

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 17, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 17:
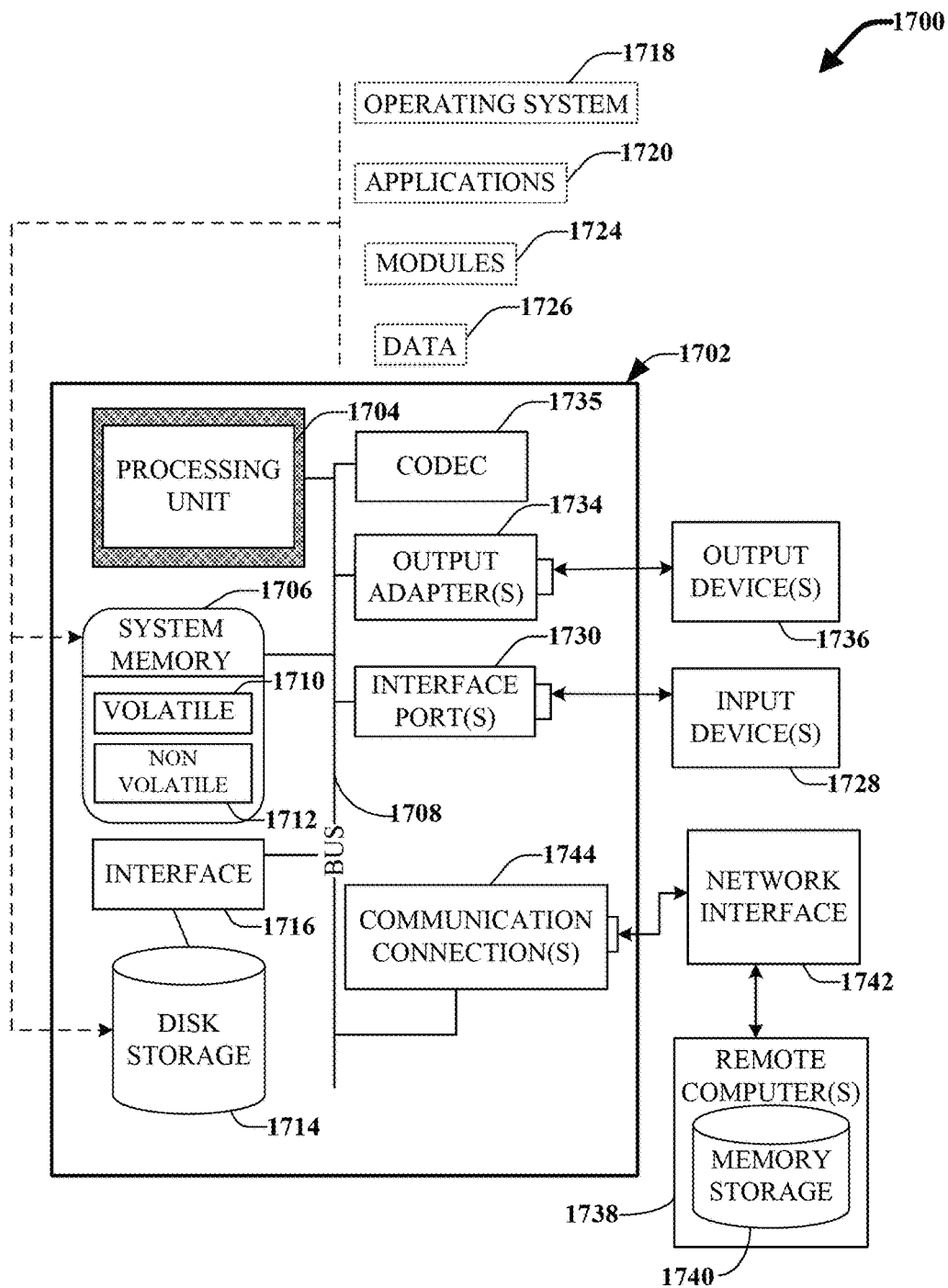
FIG. 17 illustrates a block diagram of an example, non-limiting operating environment in which one or more embodiments described herein can be facilitated.

With reference to FIG. 17, an example environment 1700 for implementing various aspects of the claimed subject matter includes a computer 1702. The computer 1702 includes a processing unit 1704, a system memory 1706, a codec 1735, and a system bus 1708. The system bus 1708 couples system components including, but not limited to, the system memory 1706 to the processing unit 1704. The processing unit 1704 can be any of various available processors. Dual microprocessors and other multiprocessor architectures also can be employed as the processing unit 1704.

The system bus 1708 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1706 includes volatile memory 1710 and non-volatile memory 1712, which can employ one or more of the disclosed memory architectures, in various embodiments. The basic input/output system (BIOS), containing the basic routines to transfer information between elements within the computer 1702, such as during start-up, is stored in non-volatile memory 1712. In addition, according to present innovations, codec 1735 can include at least one of an encoder or decoder, wherein the at least one of an encoder or decoder can consist of hardware, software, or a combination of hardware and software. Although, codec 1735 is depicted as a separate component, codec 1735 can be contained within non-volatile memory 1712. By way of illustration, and not limitation, non-volatile memory 1712 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1712 can employ one or more of the disclosed memory devices, in at least some embodiments. Moreover, non-volatile memory 1712 can be computer memory (e.g., physically integrated with computer 1702 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1710 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1702 can also include removable/non-removable, volatile/non-volatile computer storage medium. FIG. 17 illustrates, for example, disk storage 1714. Disk storage 1714 includes, but is not limited to, devices like a magnetic disk drive, solid state disk (SSD), flash memory card, or memory stick. In addition, disk storage 1714 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1714 to the system bus 1708, a removable or non-removable interface is typically used, such as interface 1716. It is appreciated that disk storage 1714 can store information related to a user. Such information might be stored at or provided to a server or to an application running on a user device. In one embodiment, the user can be notified (e.g., by way of output device(s) 1736) of the types of information that are stored to disk storage 1714 or transmitted to the server or application. The user can be provided the opportunity to opt-in or of having such information collected or shared with the server or application (e.g., by way of input from input device(s) 1728).

It is to be appreciated that FIG. 17 describes software that acts as an intermediary between users and the basic computer resources described in the suitable operating environment 1700. Such software includes an operating system 1718. Operating system 1718, which can be stored on disk storage 1714, acts to control and allocate resources of the computer system 1702. Applications 1720 take advantage of the management of resources by operating system 1718 through program modules 1724, and program data 1726, such as the boot/shutdown transaction table and the like, stored either in system memory 1706 or on disk storage 1714. It is to be appreciated that the claimed subject matter can be implemented with various operating systems or combinations of operating systems.

A user enters commands or information into the computer 1702 through input device(s) 1728. Input devices 1728 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1704 through the system bus 1708 via interface port(s) 1730. Interface port(s) 1730 include, for example, a serial port, a parallel port, a game port, and a universal serial bus (USB). Output device(s) 1736 use some of the same type of ports as input device(s) 1728. Thus, for example, a USB port can be used to provide input to computer 1702 and to output information from computer 1702 to an output device 1736. Output adapter 1734 is provided to illustrate that there are some output devices 1736 like monitors, speakers, and printers, among other output devices 1736, which require special adapters. The output adapters 1734 include, by way of illustration and not limitation, video and sound cards that provide a means of connection between the output device 1736 and the system bus 1708. It should be noted that other devices or systems of devices provide both input and output capabilities such as remote computer(s) 1738.

Computer 1702 can operate in a networked environment using logical connections to one or more remote computers, such as remote computer(s) 1738. The remote computer(s) 1738 can be a personal computer, a server, a router, a network PC, a workstation, a microprocessor based appliance, a peer device, a smart phone, a tablet, or other network node, and typically includes many of the elements described relative to computer 1702. For purposes of brevity, only a memory storage device 1740 is illustrated with remote computer(s) 1738. Remote computer(s) 1738 is logically connected to computer 1702 through a network interface 1742 and then connected via communication connection(s) 1744. Network interface 1742 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1744 refers to the hardware/software employed to connect the network interface 1742 to the bus 1708. While communication connection 1744 is shown for illustrative clarity inside computer 1702, it can also be external to computer 1702. The hardware/software necessary for connection to the network interface 1742 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for facilitating information generation, the computer program product comprising a non-transitory computer readable storage medium having program instructions embodied therewith, the program instructions executable by a processor to cause the processor to:

generate, by the processor, a consolidated data table for consolidating historical data associated with a product comprising a plurality of components with valuation proposals for the product, wherein the valuation proposals comprised in the historical data comprise only previously accepted valuation proposals for the product;

employ, by the processor, machine learning to execute a linear regression analysis using an initial component acceptance probability and a numeric product attribute correlated in the consolidated data table, to the historical data to compute a modified component acceptance probability; and generate, by the processor, according to the consolidated data table, different valuation models for the product respectively based on the historical data, different sets of model design parameters, and the modified component acceptance probability, wherein the different valuation models determine valuation information for the product based on product acceptance probability information that reflects different values for the product that will be accepted, wherein the program instructions causing the processor to generate the different valuation models based on the historical data comprise program instructions to:
 generate, by the processor, a first valuation model based on component attributes comprised in the consolidated data table, of respective components of the plurality of components, and
 generate, by the processor, a second valuation model based on collective attributes comprised in the data consolidated table, that apply to the plurality of components collectively.

2. The computer program product of claim 1, wherein the program instructions further cause the processor to:
 generate, by the processor, evaluation information for the different valuation models by evaluating the different valuation models using a second portion of the historical data, wherein the evaluation information comprises fit statistic values for the different valuation models.

3. The computer program product of claim 2, wherein the program instructions further cause the processor to:
 determine, by the processor, scores for the different valuation models based on the fit statistic values respectively associated with the different valuation models; and
 select, by the processor, a valuation model of the different valuation models associated with a score that is closest to a reference score, thereby facilitating improved processing time for generation and selection the valuation model for the product.

4. The computer program product of claim 2, wherein the program instructions further cause the processor to:
 generate, by the processor, a final valuation model for the product based on the historical data and a set of the different sets of model design parameters associated with the valuation model.

5. The computer program product of claim 1, wherein the different values comprise a low value associated with a high probability of acceptance, a median value associated with a median probability of acceptance, and a high value associated with a low probability of acceptance.

6. The computer program product of claim 1, wherein the valuation information comprises a target value for the product and wherein the different valuation models determine the target value for the product by maximizing an expected profit contribution value determined as a function of profit values respectively associated with the different values and the respective the probabilities associated with the different values.

7. The computer program product of claim 1, where the program instructions further cause the processor to generate the different valuation models based on segmentation trees respectively determined for the different valuation models based on the sets of design parameters respectively associated with the different valuation models, wherein the segmentation trees assign subsets of components of the plurality of components to different nodes of the segmentation trees.

8. The computer program product of claim 7, where the program instructions further cause the processor to employ, by the processor, the machine learning to execute a second linear regression analysis on the subsets of components as assigned to the different nodes to determine the initial component acceptance probability for the different values of the product based on correlated numeric attributes of the subsets of components included in the historical data.

9. The computer program product of claim 8, where the program instructions further cause the processor to generate the different valuation models by adjusting the different values based on a bias adjustment factor that accounts for bias associated with using the historical data that comprises only the previously accepted valuation proposals for the product, thereby generating the different values.

10. The computer program product of claim 1, wherein the consolidated data table comprises:
 a plurality of component rows, with each component row of the plurality of component rows comprises a component identifier to identify the component row, wherein each of the component rows corresponds to a record of information describing a component, and
 a plurality of attribute columns intersecting the plurality of component rows to define a plurality of logical cells, each attribute column of the plurality of attribute columns comprising a design rule field identifier to identify attribute columns describing respective component attributes, and wherein values of the plurality of attribute columns facilitate indexing consolidated data stored in the consolidated data table.

11. The computer program product of claim 1, wherein the plurality of attribute columns comprises an attribute column corresponding to a collective attribute of the valuation proposals referencing the respective components of the plurality of components.

12. A system, comprising:
 a memory that stores computer executable components;
 a processor that executes computer executable components stored in the memory, wherein the computer executable components comprise:
  an indexing component that generates a consolidated data table for consolidating historical data associated with a product that comprises a plurality of components, wherein valuation proposals for the product comprised in the historical data comprise only previously accepted valuation proposals for the product;
  a collective attribute analysis component that employs machine learning to execute a linear regression analysis of collective attributes comprised in the consolidated data table that apply to the plurality of components collectively, using an initial component acceptance probability and a numeric product attribute correlated in the consolidated data table, to the historical data to compute a modified component acceptance probability; and
  a model creation component that generates according to the consolidated data table, a valuation model for the product based on the modified component acceptance probability, the historical data, and one or more model design parameters, wherein the valuation model determines valuation information for the product based on a product acceptance probability function that determines different values for the product, determined based on the historical data, that will be accepted, wherein a first valuation model is based on component attributes comprised in the consolidated data table, of respective components of the plurality of components, and a second valuation model is based on collective attributes comprised in the data consolidated table, that apply to the plurality of components collectively.

13. The system of claim 12, wherein the different values comprise a low value associated with a high acceptance probability, a median price value associated with a median acceptance probability, and a high value associated with a low acceptance probability.

14. The system of claim 12, wherein the valuation information comprises a target value for the product and wherein the valuation model determines the target value by maximizing an expected profit contribution value determined as a function of profit values respectively associated with the different values and the probabilities associated with the different values.

15. The system of claim 12, wherein the model creation component comprises:
a segmentation component that generates a segmentation tree for the product based on the one or more model design parameters, wherein the segmentation tree assigns subsets of components of the plurality of components to different nodes of the segmentation tree, and wherein the model creation component generates the valuation model based on the segmentation tree.

16. The system of claim 15, wherein the model creation component further comprises:
a component attribute analysis component that employs the machine learning to execute a second linear regression analysis on component attributes of respective components of the subsets of components as assigned to the different nodes to determine the initial component acceptance probability for the different values of the product based on correlated numeric attributes of the subsets of components included in the historical data.

17. The system of claim 16, wherein the model creation component further comprises:
an adjustment component that further adjusts the different values based on a bias adjustment factor that accounts for bias associated with using the historical data that comprises only the previously accepted valuation proposals for the product, thereby generating the different values.

18. A computer-implemented method comprising:
generate, by a device operatively coupled to a processor, a consolidated data table organizing historical data associated with a product comprising respective components;
receiving, by the device, a valuation request for the product, wherein the valuation request comprises product information identifying the product and the respective components of the product;
employing, by the device, the machine learning to execute a linear regression analysis using an initial component acceptance probability and a numeric product attribute correlated in the consolidated data table, to historical data to compute a modified component acceptance probability; and
determining, by the device, valuation information for the product based on the product information and a valuation model generated for the product, wherein the valuation model was generated based on the modified component acceptance probability, valuation proposals comprised in the historical data, and different values for the product determined based on the historical data and an acceptance probability information function that determines the different values based on probabilities that the different values will be accepted, wherein the valuation proposals comprised in the historical data comprise only previously accepted valuation proposals, and wherein the valuation model was generated based on the historical data comprising, component attributes of the respective components of the product and collective attributes that apply to the plurality of components collectively.

19. The computer-implemented method of claim 18, wherein the determining the valuation information comprises determining a target value for the product based on the product information using the valuation model, wherein the valuation model is configured to determine the target value by maximizing an expected profit contribution value determined as a function of profit values respectively associated with the different values and the probabilities associated with the different values.

20. The computer-implemented method of claim 18, wherein the different values comprise a low value associated with a high probability of acceptance, a median value associated with a median probability of acceptance, and a high value associated with a low probability of acceptance.

21. The computer-implemented method of claim 18, further comprising:
employing, by the device, machine learning to execute a second linear regression analysis using a numeric component attribute correlated to the historical data to compute the initial component acceptance probability for the plurality of components.

* * * * *